(12) United States Patent
Michikawauchi

(10) Patent No.: US 12,409,705 B2
(45) Date of Patent: Sep. 9, 2025

(54) THERMAL MANAGEMENT SYSTEM, VEHICLE INCLUDING THE SAME, AND CONTROL METHOD FOR THERMAL MANAGEMENT CIRCUIT

(71) Applicant: TOYOTA JIDOSHA KABUSHIKI KAISHA, Toyota (JP)

(72) Inventor: Ryo Michikawauchi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 18/485,500

(22) Filed: Oct. 12, 2023

(65) Prior Publication Data

US 2024/0190210 A1    Jun. 13, 2024

(30) Foreign Application Priority Data

Dec. 13, 2022 (JP) ................. 2022-198696

(51) Int. Cl.
*B60H 1/00* (2006.01)
*B60H 1/22* (2006.01)

(52) U.S. Cl.
CPC ..... *B60H 1/00885* (2013.01); *B60H 1/00278* (2013.01); *B60H 1/00892* (2013.01); *B60H 1/2218* (2013.01); *B60H 1/2221* (2013.01)

(58) Field of Classification Search
CPC ............ B60H 1/00885; B60H 1/00278; B60H 1/00892; B60H 1/2218; B60H 1/2221

USPC ........................................................ 165/202
See application file for complete search history.

(56) References Cited

U.S. PATENT DOCUMENTS

2018/0162379 A1   6/2018   Mizuno et al.
2022/0009309 A1   1/2022   Miura et al.

FOREIGN PATENT DOCUMENTS

| JP | 2018-098857 A | 6/2018 | | |
|---|---|---|---|---|
| JP | 2020-165604 A | 10/2020 | | |
| JP | 2021042808 A | * | 3/2021 | ......... B60H 1/00485 |
| JP | 2021042809 A | * | 3/2021 | ......... B60H 1/00485 |

* cited by examiner

*Primary Examiner* — Davis D Hwu
(74) *Attorney, Agent, or Firm* — Oliff PLC

(57) ABSTRACT

A thermal management system includes a five-way valve configured to switch a first circuit mode in which a chiller and a battery are thermally connected and a second circuit mode in which the chiller and an LT radiator are thermally connected, and an ECU configured to control a compressor based on a chiller temperature and a radiator temperature. The ECU is configured to, in a case where switching between the first circuit mode and the second circuit mode is performed by controlling the five-way valve during a heating operation of a refrigeration cycle, control the compressor to reduce a temperature difference between the chiller temperature and the radiator temperature prior to the switching.

16 Claims, 19 Drawing Sheets

< FIRST CIRCUIT MODE >

< SECOND CIRCUIT MODE >

< FIRST CIRCUIT MODE >

< SECOND CIRCUIT MODE >

THERMAL MANAGEMENT SYSTEM, VEHICLE INCLUDING THE SAME, AND CONTROL METHOD FOR THERMAL MANAGEMENT CIRCUIT

CROSS-REFERENCE TO RELATED APPLICATION

This application claims priority to Japanese Patent Application No. 2022-198696 filed on Dec. 13, 2022, incorporated herein by reference in its entirety.

BACKGROUND

1. Technical Field

The present disclosure relates to a thermal management system, a vehicle including the thermal management system, and a control method for a thermal management circuit.

2. Description of Related Art

A refrigeration cycle device disclosed in Japanese Unexamined Patent Application Publication No. 2020-165604 (JP 2020-165604 A) includes a heat pump cycle, a high-temperature heat medium circuit, and a low-temperature heat medium circuit. The low-temperature heat medium circuit includes a plurality of heat absorption devices that absorbs heat in a low-temperature heat medium flowing out of a low-temperature heat medium-refrigerant heat exchanger, and a heat absorption adjusting unit that changes the heat absorption amount of the low-temperature heat medium in the heat absorption devices. The heat absorption adjusting unit reduces the flow rate of a refrigerant flowing into the heat exchanger of the heat pump cycle (low-temperature heat medium-refrigerant heat exchanger) when changing the heat absorption amount of the low-temperature heat medium in the heat absorption devices.

SUMMARY

A thermal management system having the following configuration has been proposed. The thermal management system includes a battery through which a heat medium flows, a radiator through which the heat medium flows, a refrigeration cycle (heat pump circuit) through which a refrigerant flows, a chiller that exchanges heat between the heat medium and the refrigerant, and a switching valve. The switching valve switches a first circuit mode in which the chiller and the battery are thermally connected and a second circuit mode in which the chiller and the radiator are thermally connected.

In such a thermal management system, when the first circuit mode is switched to the second circuit mode during a heating operation of the refrigeration cycle, the temperature at an air outlet of heating air may change significantly. As a result, air conditioning comfort may deteriorate.

The present disclosure provides a thermal management system, a vehicle including the thermal management system, and a control method for a thermal management circuit that suppress deterioration of air conditioning comfort when a first circuit mode is switched to a second circuit mode during a heating operation of a refrigeration cycle.

(1) A first aspect of the present disclosure provides a thermal management system. The thermal management system includes a battery through which a heat medium flows, a radiator through which the heat medium flows, a refrigeration cycle through which a refrigerant flows, a chiller configured to exchange heat between the heat medium and the refrigerant, and a switching valve configured to switch a first circuit mode and a second circuit mode. The first circuit mode is a mode in which the chiller is thermally connected to the battery. The second circuit mode is a mode in which the chiller is thermally disconnected from the battery and is thermally connected to the radiator. The thermal management system includes a first temperature sensor configured to detect a chiller temperature that is a temperature of the refrigerant flowing through the chiller, a second temperature sensor configured to detect a radiator temperature that is a temperature of the heat medium flowing through the radiator, a temperature adjustment device configured to adjust the temperature of one of the heat medium and the refrigerant, and a control device configured to control the temperature adjustment device based on the chiller temperature and the radiator temperature. The control device is configured to, in a case where switching between the first circuit mode and the second circuit mode is performed by controlling the switching valve during a heating operation of the refrigeration cycle, control the temperature adjustment device to reduce a temperature difference between the chiller temperature and the radiator temperature prior to the switching.

In the above aspect (1), the temperature adjustment device is controlled to reduce the temperature difference between the chiller temperature and the radiator temperature prior to the switching of the circuit modes. Thus, it is possible to suppress a steep change in the chiller temperature along with the switching of the circuit modes. According to the above aspect (1), it is possible to suppress deterioration of air conditioning comfort.

(2) In the above aspect, the control device may be configured to, when the temperature difference between the chiller temperature and the radiator temperature is larger than a reference value in the case where the switching between the first circuit mode and the second circuit mode is performed by controlling the switching valve during the heating operation of the refrigeration cycle, control the temperature adjustment device to reduce the temperature difference below the reference value prior to the switching. The reference value may be a predetermined value set to suppress deterioration of air conditioning comfort performance.

(3) In the above aspect, the temperature adjustment device may include a compressor configured to compress the refrigerant flowing through the refrigeration cycle. The control device may be configured to, when the temperature difference is larger than the reference value in the first circuit mode in a case where switching from the first circuit mode to the second circuit mode is performed at an end of cooling of the battery by the chiller during the heating operation of the refrigeration cycle, control a rotation speed of the compressor to reduce the temperature difference below the reference value.

(4) In the above aspect, the control device may be configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, reduce the chiller temperature by increasing the rotation speed of the compressor in the first circuit mode compared to a case where the temperature difference is smaller than the reference value.

(5) In the above aspect, the control device may be configured to, when the temperature difference is larger than the reference value in a case where the switching from the first circuit mode to the second circuit mode is performed at the end of the cooling of the battery by the chiller during the heating operation of the refrigeration cycle and the chiller temperature is lower than the radiator temperature in the first circuit mode, increase the chiller temperature by reducing the rotation speed of the compressor in the first circuit mode compared to a case where the temperature difference is smaller than the reference value.

In the above configurations (3) to (5), the control is performed to reduce the temperature difference between the chiller temperature and the radiator temperature below the reference value by adjusting the rotation speed of the compressor configured to compress the refrigerant flowing through the refrigeration cycle. This also makes it possible to suppress the steep change in the chiller temperature along with the switching from the first circuit mode to the second circuit mode. According to the above configurations (3) to (5), it is possible to suppress the deterioration of the air conditioning comfort.

(6) In the above aspect, the temperature adjustment device may include an electric heater configured to heat the heat medium flowing through the radiator. The control device may be configured to, when the temperature difference is larger than the reference value in the first circuit mode in a case where switching from the first circuit mode to the second circuit mode is performed at an end of cooling of the battery by the chiller, control a heat generation amount of the electric heater to reduce the temperature difference below the reference value.

(7) In the above aspect, the control device may be configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, increase the radiator temperature by increasing the heat generation amount of the electric heater compared to a case where the temperature difference is smaller than the reference value.

(8) In the above aspect, the temperature adjustment device may include a power conversion device through which the heat medium flowing through the radiator flows. The control device may be configured to, when the temperature difference is larger than the reference value in the first circuit mode in a case where switching from the first circuit mode to the second circuit mode is performed at an end of cooling of the battery by the chiller, control a heat loss of the power conversion device to reduce the temperature difference below the reference value.

(9) In the above aspect, the control device may be configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, increase the radiator temperature by increasing the heat loss of the power conversion device compared to a case where the temperature difference is smaller than the reference value.

In the above configurations (6) to (9), the control is performed to reduce the temperature difference between the chiller temperature and the radiator temperature below the reference value by adjusting the heat generation amount of the electric heater configured to heat the heat medium flowing through the radiator or by adjusting the heat loss of the power conversion device through which the heat medium flowing through the radiator flows. This also makes it possible to suppress the steep change in the chiller temperature when the first circuit mode is switched to the second circuit mode at the end of the cooling of the battery by the chiller. According to the above configurations (6) to (9), it is possible to suppress the deterioration of the air conditioning comfort.

(10) In the above aspect, the temperature adjustment device may include an electric heater configured to heat the heat medium flowing through the radiator. The control device may be configured to, when the temperature difference is larger than the reference value in the second circuit mode in a case where switching from the second circuit mode to the first circuit mode is performed to start cooling of the battery by the chiller, control a heat generation amount of the electric heater to reduce the temperature difference below the reference value.

(11) In the above aspect, the control device may be configured to, when the temperature difference is larger than the reference value in the second circuit mode in a case where the switching from the second circuit mode to the first circuit mode is performed to start the cooling of the battery by the chiller and the chiller temperature is higher than the radiator temperature in the second circuit mode, increase the radiator temperature by increasing the heat generation amount of the electric heater compared to a case where the temperature difference is smaller than the reference value.

(12) In the above aspect, the temperature adjustment device may include a power conversion device through which the heat medium flowing through the radiator flows. The control device may be configured to, when the temperature difference is larger than the reference value in the second circuit mode in a case where switching from the second circuit mode to the first circuit mode is performed to start cooling of the battery by the chiller, control a heat loss of the power conversion device to reduce the temperature difference below the reference value.

(13) In the above aspect, the control device may be configured to, when the temperature difference is larger than the reference value in the second circuit mode in a case where the switching from the second circuit mode to the first circuit mode is performed to start the cooling of the battery by the chiller and the chiller temperature is higher than the radiator temperature in the second circuit mode, increase the radiator temperature by increasing the heat loss of the power conversion device compared to a case where the temperature difference is smaller than the reference value.

In the above configurations (10) to (13), the control is performed to reduce the temperature difference between the chiller temperature and the radiator temperature below the reference value by adjusting the heat generation amount of the electric heater configured to heat the heat medium flowing through the radiator or by adjusting the heat loss of the power conversion device through which the heat medium flowing through the radiator flows. This also makes it possible to suppress the steep change in the chiller temperature when the second circuit mode is switched to the first circuit mode to start the cooling of the battery by the chiller. According to the above configurations (10) to (13), it is possible to suppress the deterioration of the air conditioning comfort.

(14) A vehicle according to a second aspect of the present disclosure includes the thermal management system described above.

(15) In a control method for a thermal management circuit according to a third aspect of the present disclosure, the thermal management circuit includes a battery through which a heat medium flows, a radiator through which the heat medium flows, a refrigeration cycle through which a refrigerant flows, a chiller configured to exchange heat between the heat medium and the refrigerant, a switching valve configured to switch a first circuit mode in which the chiller is thermally connected to the battery and a second circuit mode in which the chiller is thermally disconnected from the battery and is thermally connected to the radiator, and a temperature adjustment device configured to adjust a temperature of one of the heat medium and the refrigerant. The control method includes a step of detecting a chiller temperature that is a temperature of the refrigerant flowing through the chiller, a step of detecting a radiator temperature that is a temperature of the heat medium flowing through the radiator, and a step of controlling the temperature adjustment device based on the chiller temperature and the radiator temperature. The step of controlling includes a step of controlling, in a case where switching between the first circuit mode and the second circuit mode is performed by controlling the switching valve during a heating operation of the refrigeration cycle, the temperature adjustment device to reduce a temperature difference between the chiller temperature and the radiator temperature prior to the switching.

According to the above configuration (15), it is possible to suppress the deterioration of the air conditioning comfort as in the above configuration (1). According to the above method (15), it is possible to suppress the deterioration of the air conditioning comfort as in the above configuration (1).

(16) In the above aspect, the step of controlling may include a step of controlling, when the temperature difference between the chiller temperature and the radiator temperature is larger than a reference value in the case where the switching between the first circuit mode and the second circuit mode is performed by controlling the switching valve during the heating operation of the refrigeration cycle, the temperature adjustment device to reduce the temperature difference below the reference value prior to the switching. The reference value may be a predetermined value set to suppress deterioration of air conditioning comfort performance.

According to the present disclosure, it is possible to suppress the deterioration of the air conditioning comfort when the first circuit mode is switched to the second circuit mode during the heating operation of the thermal management system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described in detail below with reference to the drawings. The same or corresponding portions are denoted by the same signs throughout the drawings, and description thereof will not be repeated.

Hereinafter, description will be given about an exemplary configuration in which a thermal management system according to the present disclosure is mounted on a vehicle. The vehicle is a vehicle including a battery for traveling, and is, for example, a battery electric vehicle (BEV). The vehicle may be a hybrid electric vehicle (HEV), a plug-in hybrid electric vehicle (PHEV), or a fuel cell electric vehicle (FCEV). The use of the thermal management system according to the present disclosure is not limited to the use for the vehicle.

First Embodiment

System Configuration

Figure 1:
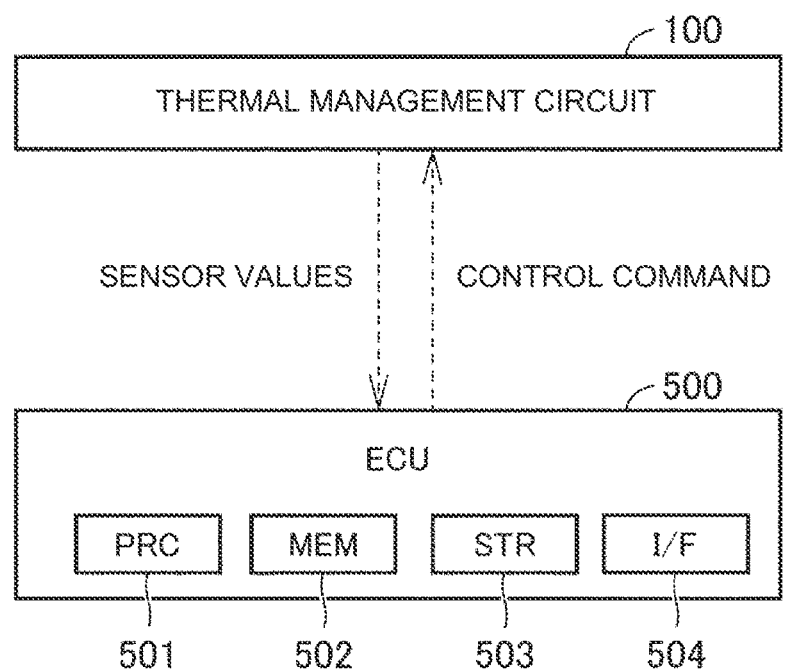
FIG. 1 shows an example of an overall configuration of a thermal management system according to a first embodiment of the present disclosure.

FIG. 1 shows an example of an overall configuration of a thermal management system according to a first embodiment of the present disclosure. A thermal management system 1 includes a thermal management circuit 100 and an electronic control unit (ECU) 500.

The thermal management circuit 100 is configured such that a heat medium and a refrigerant flow. The thermal management circuit 100 outputs various sensor values to the ECU 500. The configuration of the thermal management circuit 100 will be described with reference to FIG. 2.

The ECU 500 controls the thermal management circuit 100 by outputting a control command to the thermal management circuit 100 based on the sensor values from the thermal management circuit 100. The ECU 500 includes a processor 501, a memory 502, a storage 503, and an interface 504. The processor 501 is, for example, a central processing unit (CPU) or a micro-processing unit (MPU). The memory 502 is, for example, a random access memory (RAM). The storage 503 is a rewritable non-volatile memory such as a hard disk drive (HDD), a solid state drive (SSD), or a flash memory. The storage 503 stores a system program that includes an operating system (OS), and a control program that includes computer-readable codes that are necessary for control computation. The processor 501 implements various processes by reading the system program and the control program and loading such programs in the memory 502. The interface 504 controls communication between the ECU 500 and components of the thermal management circuit 100.

The ECU 500 corresponds to a "control device" of the present disclosure. The ECU 500 may be divided into a plurality of ECUs by function. While the ECU 500 includes one processor 501 in FIG. 1, the ECU 500 may include a plurality of processors. The same applies to the memory 502 and the storage 503.

The "processor" is not herein limited to a processor in a narrow sense that executes a process by a stored program method, and may include hardwired circuitry such as an application specific integrated circuit (ASIC) and a field-programmable gate array (FPGA). Therefore, the term "processor" may be replaced with processing circuitry that executes a process defined in advance by computer-readable codes and/or hardwired circuitry.

Circuit Configuration

Figure 2:
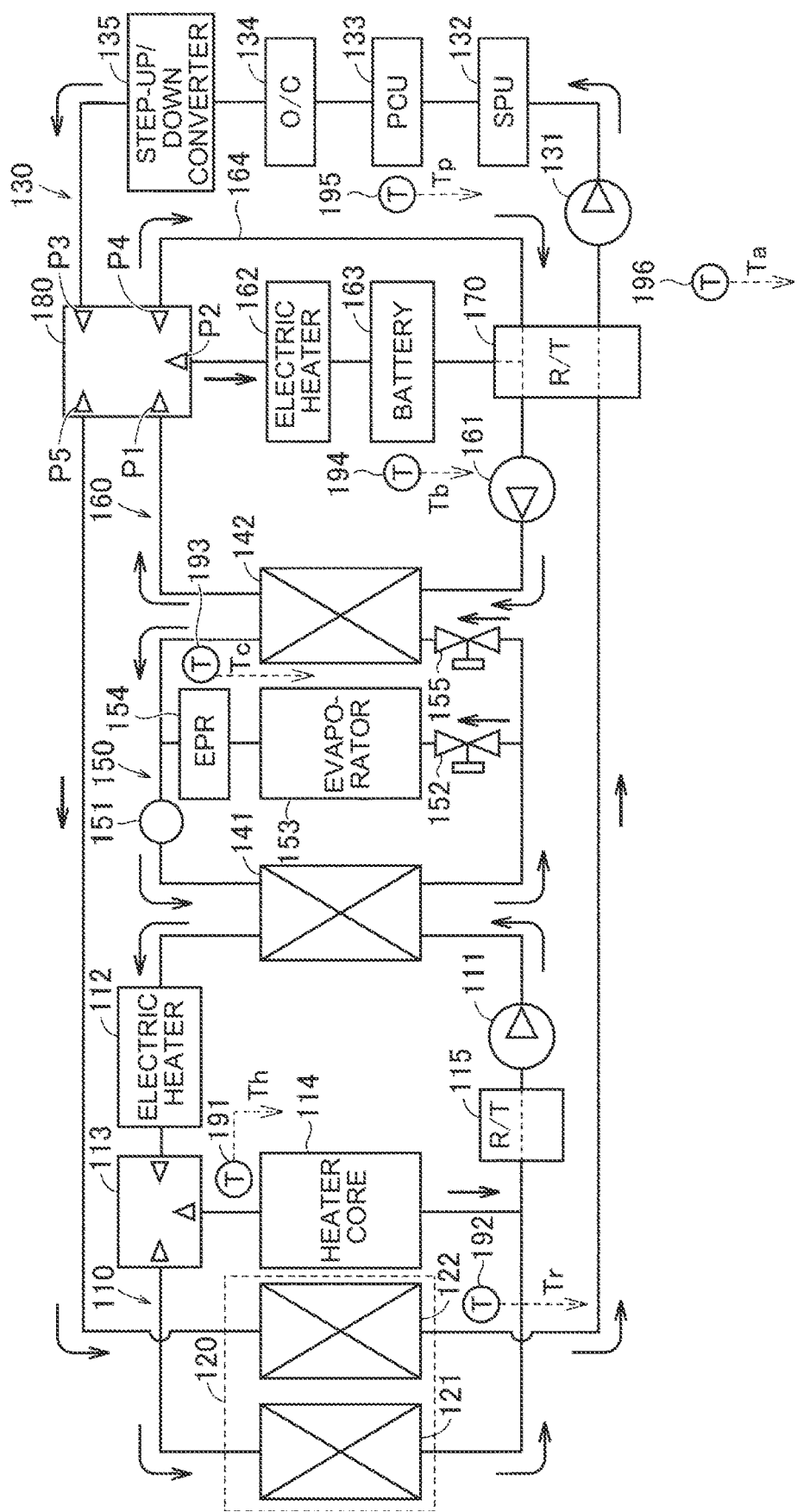
FIG. 2 shows an example of the configuration of a thermal management circuit.

FIG. 2 shows an example of the configuration of the thermal management circuit 100. The thermal management circuit 100 includes, for example, a high temperature (HT) circuit 110, a radiator 120, a low temperature (LT) circuit 130, a condenser 141, a chiller 142, a refrigeration cycle 150, a battery circuit 160, a reservoir tank (R/T) 170, a five-way valve 180, and temperature sensors 191 to 196.

The HT circuit 110 includes, for example, a water pump (W/P) 111, an electric heater 112, a three-way valve 113, a heater core 114, and a reservoir tank 115. The radiator 120 includes a high temperature (HT) radiator 121 and a low temperature (LT) radiator 122. The LT circuit 130 includes, for example, a water pump 131, a smart power unit (SPU) 132, a power control unit (PCU) 133, an oil cooler (O/C) 134, and a step-up/down converter 135. The refrigeration cycle 150 includes, for example, a compressor 151, an expansion valve 152, an evaporator 153, an evaporative pressure regulator (EPR) 154, and an expansion valve 155. The battery circuit 160 includes, for example, a water pump 161, an electric heater 162, a battery 163, and a bypass path 164.

A heat medium (generally hot water) circulating in the HT circuit 110 flows through one or both of a first path and a second path. The first path is a path of "water pump 111-condenser 141-electric heater 112-three-way valve 113-heater core 114-reservoir tank 115-water pump 111". The second path is a path of "water pump 111-condenser 141 electric heater 112-three-way valve 113-HT radiator 121-reservoir tank 115-water pump 111".

The water pump 111 circulates the heat medium in the HT circuit 110 in accordance with a control command from the ECU 500. The condenser 141 heats the heat medium circulating in the HT circuit 110 by receiving heat released from the heat medium circulating in the refrigeration cycle 150. The electric heater 112 heats the heat medium in accordance with a control command from the ECU 500. The three-way valve 113 switches the first path and the second path in accordance with a control command from the ECU 500. The heater core 114 exchanges heat between the heat medium circulating in the HT circuit 110 and air blown into a vehicle cabin to heat the air (heating operation). The reservoir tank 115 maintains the pressure and the amount of the heat medium in the HT circuit 110 by storing a part of the heat medium in the HT circuit 110 (heat medium flowing out along with a pressure increase).

The HT radiator 121 is connected to the HT circuit 110. The HT radiator 121 is disposed downstream of a grille shutter (not shown), and exchanges heat between air outside the vehicle and the heat medium. The LT radiator 122 is connected to the LT circuit 130. The LT radiator 122 is disposed near the HT radiator 121, and exchanges heat with the HT radiator 121. The LT radiator 122 corresponds to a "radiator" according to the present disclosure.

A heat medium (coolant) circulating in the LT circuit 130 flows through a path of "water pump 131-SPU 132-PCU 133-oil cooler 134-step-up/down converter 135-five-way valve 180-LT radiator 122-reservoir tank 170-water pump 131".

The water pump 131 circulates the heat medium in the LT circuit 130 in accordance with a control command from the ECU 500. The SPU 132 controls charge and discharge of the battery 163 in accordance with a control command from the ECU 500. The PCU 133 converts direct-current (DC) power supplied from the battery 163 into alternating-current (AC) power and supplies the AC power to a motor (not shown) built in a transaxle in accordance with a control command from the ECU 500. The oil cooler 134 circulates lubricating oil for the motor by using an electrical oil pump (EOP) (not shown). The oil cooler 134 cools the transaxle through heat exchange between the heat medium circulating in the LT circuit 130 and the lubricating oil for the motor. The step-up/down converter 135 steps up or down a voltage of the battery 163 in accordance with a control command from the ECU 500. The SPU 132, the PCU 133, the oil cooler 134, and the step-up/down converter 135 are cooled by the heat medium circulating in the LT circuit 130.

The condenser 141 is connected to both the HT circuit 110 and the refrigeration cycle 150. The condenser 141 releases heat from the heat medium circulating in the refrigeration cycle 150. The chiller 142 is connected to both the refrigeration cycle 150 and the battery circuit 160. The chiller 142 exchanges heat between the heat medium circulating in the refrigeration cycle 150 and the heat medium circulating in the battery circuit 160.

A heat medium (gas-phase refrigerant or liquid-phase refrigerant) circulating in the refrigeration cycle 150 flows through one or both of a first path and a second path. The first path is a path of "compressor 151-condenser 141-expansion valve 152-evaporator 153-EPR 154-compressor 151". The second path is a path of "compressor 151-condenser 141-expansion valve 155-chiller 142-compressor 151".

The compressor 151 compresses the gas-phase refrigerant circulating in the refrigeration cycle 150 in accordance with a control command from the ECU 500. The rotation speed of the compressor 151 is controlled based on a deviation between a target value and a current value of a blowing temperature. The condenser 141 releases heat from the high-temperature and high-pressure gas-phase refrigerant compressed by the compressor 151 to condense the gas-phase refrigerant into a liquid-phase refrigerant. The high-temperature and high-pressure refrigerant compressed by the compressor 151 releases heat to the heat medium (hot water) circulating in the HT circuit 110 through heat exchange in the condenser 141. Air (heating air) heated by releasing the heat of the heated hot water in the heater core 114 is sent into the vehicle cabin from the air outlet (heating operation). The expansion valve 152 expands the high-pressure liquid-phase refrigerant condensed by the condenser 141 to decompress the liquid-phase refrigerant. The evaporator 153 exchanges heat between air blown to the evaporator 153 and the liquid-phase refrigerant to cool the air (cooling operation). The EPR 154 regulates the pressure inside the evaporator 153 to be substantially constant by controlling the flow rate of the refrigerant flowing into the EPR 154 from the evaporator 153. Similarly to the expansion valve 152, the expansion valve 155 expands the high-pressure liquid-phase refrigerant condensed by the condenser 141 to decompress the liquid-phase refrigerant. The chiller 142 evaporates the liquid-phase refrigerant decompressed by the expansion valve 155. Thus, heat is taken away from a refrigerant circulating in the battery circuit 160 to cool the refrigerant.

A heat medium (coolant) circulating in the battery circuit 160 flows through one or both of a first path and a second path. The first path is a path of "water pump 161-chiller 142-five-way valve 180-electric heater 162-battery 163-reservoir tank 170-water pump 161". The second path is a path of "water pump 161-chiller 142-five-way valve 180-bypass path 164-reservoir tank 170-water pump 161".

The water pump 161 circulates the heat medium in the battery circuit 160 in accordance with a control command from the ECU 500. The chiller 142 exchanges heat between the heat medium circulating in the refrigeration cycle 150 and the heat medium circulating in the battery circuit 160 to cool the heat medium circulating in the battery circuit 160. The electric heater 162 heats the heat medium in accordance with a control command from the ECU 500. The battery 163 supplies electric power for traveling to the motor built in the transaxle. The battery 163 may be heated by using the electric heater 162 or cooled by using the chiller 142. The bypass path 164 is provided to cause the heat medium to bypass the electric heater 162 and the battery 163. When the heat medium flows through the bypass path 164, changes in the temperature of the heat medium along with heat absorption and heat release between the heat medium and the battery 163 can be suppressed.

The reservoir tank 170 is connected to both the LT circuit 130 and the battery circuit 160 in this example. The reservoir tank 170 maintains the pressure and the amount of the heat medium by storing a part of the heat medium flowing through the LT circuit 130 and the battery circuit 160.

The five-way valve 180 is connected to the LT circuit 130 and the battery circuit 160. The five-way valve 180 switches the path of the heat medium in the LT circuit 130 and the battery circuit 160 in accordance with a control command from the ECU 500. The five-way valve 180 corresponds to a "switching valve" according to the present disclosure.

The temperature sensor 191 detects the temperature of the heat medium flowing in the heater core 114 (heater core medium temperature Th). The temperature sensor 192 detects the temperature of the heat medium flowing in the LT radiator 122 (radiator medium temperature Tr). The temperature sensor 193 detects the temperature (chiller medium temperature Tc) of the refrigerant (may be a heat medium instead of the refrigerant) flowing in the chiller 142. The temperature sensor 194 detects the temperature of the heat medium flowing in the battery 163 (battery medium temperature Tb). The temperature sensor 195 detects the temperature of the heat medium flowing in the PCU 133 (powertrain medium temperature Tp). The temperature sensor 196 detects the temperature outside the vehicle (outside air temperature Ta). The sensors output sensor values indicating detection results to the ECU 500. The temperature sensor 193 corresponds to a "first temperature sensor" according to the present disclosure. The temperature sensor 192 corresponds to a "second temperature sensor" according to the present disclosure.

The ECU 500 generates a control command based on the sensor values acquired from the temperature sensors 191 to 195 in the thermal management circuit 100, and outputs the generated control command to the thermal management circuit 100.

Circuit Modes

The thermal management system 1 has a plurality of circuit modes switchable by controlling the five-way valve 180. A first circuit mode and a second circuit mode among the circuit modes will be described below.

Figure 3:
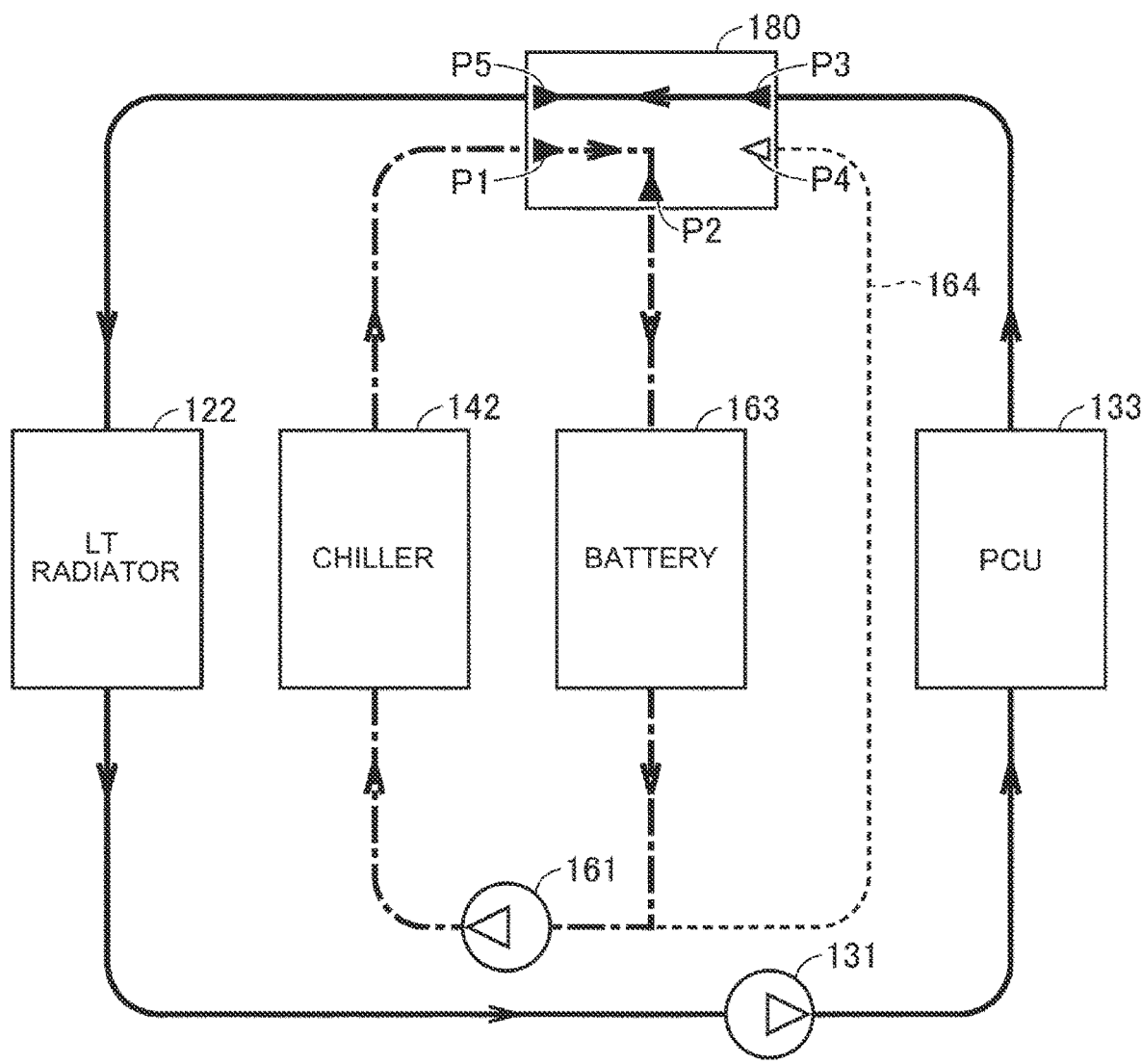
FIG. 3 illustrates an example of a first circuit mode according to the first embodiment.
Figure 4:
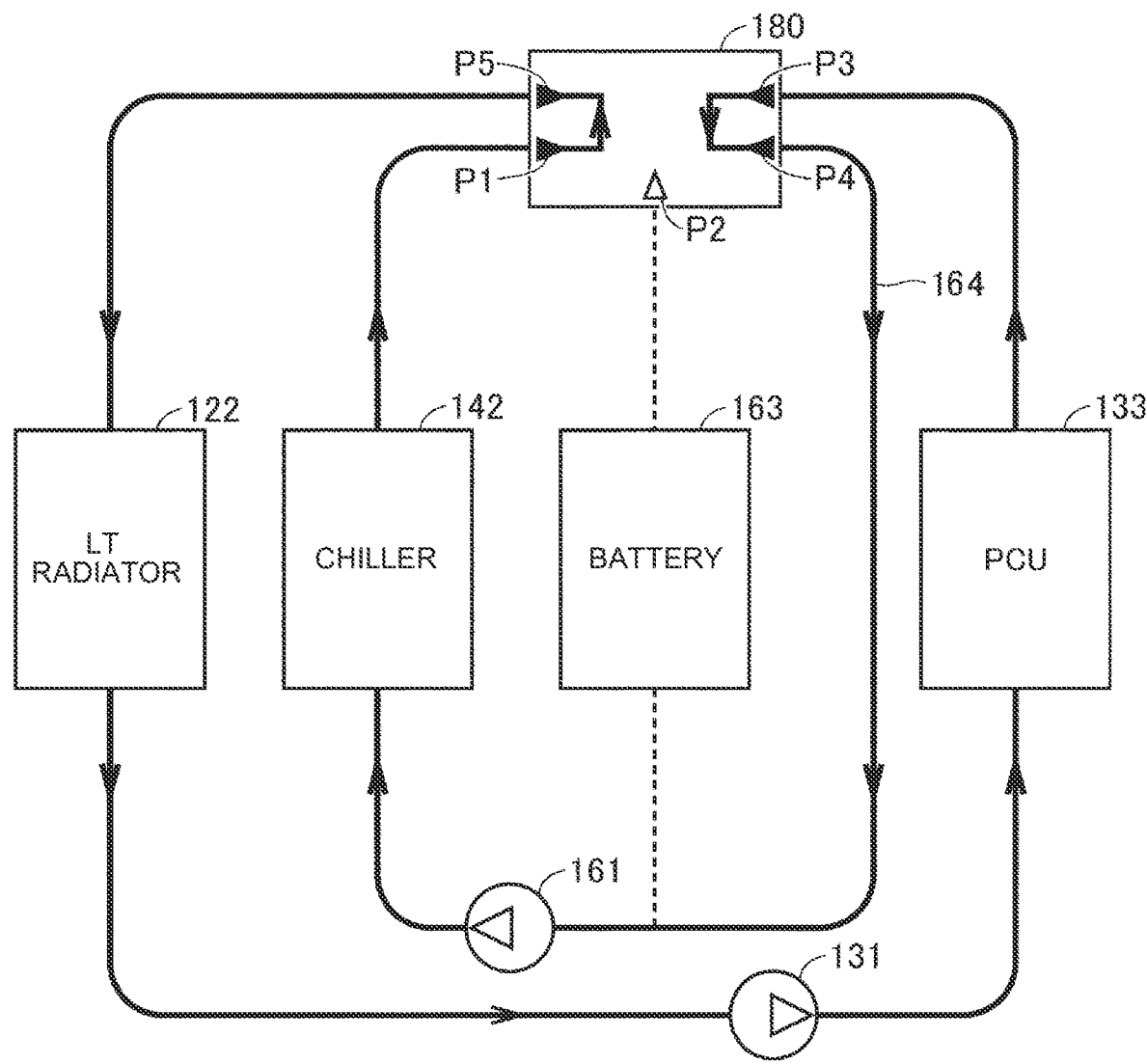
FIG. 4 illustrates an example of a second circuit mode according to the first embodiment.

FIG. 3 illustrates an example of the first circuit mode according to the first embodiment. FIG. 4 illustrates the second circuit mode according to the first embodiment. FIGS. 3 and 4 show only representative components among the components of the thermal management system 1 described in FIG. 1 for easy understanding.

Referring to FIG. 3, the first circuit mode is a mode in which the chiller 142 is thermally connected to the battery 163 (battery circuit 160). In the first circuit mode illustrated in FIG. 3, the five-way valve 180 is controlled so that ports P1 and P2 communicate with each other and ports P3 and P5 communicate with each other. Thus, the LT circuit 130 and the battery circuit 160 are connected in parallel (in other words, formed independently of each other). More specifically, a first path (LT circuit 130) is formed such that the heat medium flows in the order of "water pump 131-PCU 133-port P3-port P5-LT radiator 122-water pump 131", and a second path (battery circuit 160) is formed such that the heat medium flows in the order of "water pump 161-chiller 142-port P1-port P2-battery 163-water pump 161".

Referring to FIG. 4, the second circuit mode is a mode in which the chiller 142 is thermally connected to the LT radiator 122 (LT circuit 130). In the second circuit mode illustrated in FIG. 4, the five-way valve 180 is controlled so that the ports P1 and P5 communicate with each other and the ports P3 and P4 communicate with each other. Thus, the LT circuit 130 and the battery circuit 160 are connected in series. More specifically, a single path is formed such that the heat medium flows in the order of "water pump 131-PCU 133-port P3-port P4-bypass path 164-water pump 161-chiller 142-port P1-port P5-LT radiator 122-water pump 131".

The first circuit mode is not limited to the mode shown in FIG. 3 as long as the chiller 142 is thermally connected to the battery 163. The second circuit mode is not limited to the mode shown in FIG. 4 as long as the chiller 142 is thermally connected to the LT radiator 122 and is not thermally connected to the battery 163.

After a sufficient period has elapsed in the first circuit mode, the radiator medium temperature Tr and the powertrain medium temperature Tp are approximately equal to each other. Further, the chiller medium temperature Tc and the battery medium temperature Tb are approximately equal to each other. The chiller medium temperature Tc and the radiator medium temperature Tr may differ from each other. After a sufficient period has elapsed in the second circuit mode, the chiller medium temperature Tc and the radiator medium temperature Tr are approximately equal to each other.

Change in Chiller Medium Temperature

During the heating operation of the thermal management system 1 configured as described above, the temperature of the heat medium flowing through the chiller 142 (chiller medium temperature Tc) may steeply change along with switching of the circuit modes. The first embodiment illustrates an example in which the chiller medium temperature Tc steeply changes at the end of cooling of the battery 163.

Figure 5:
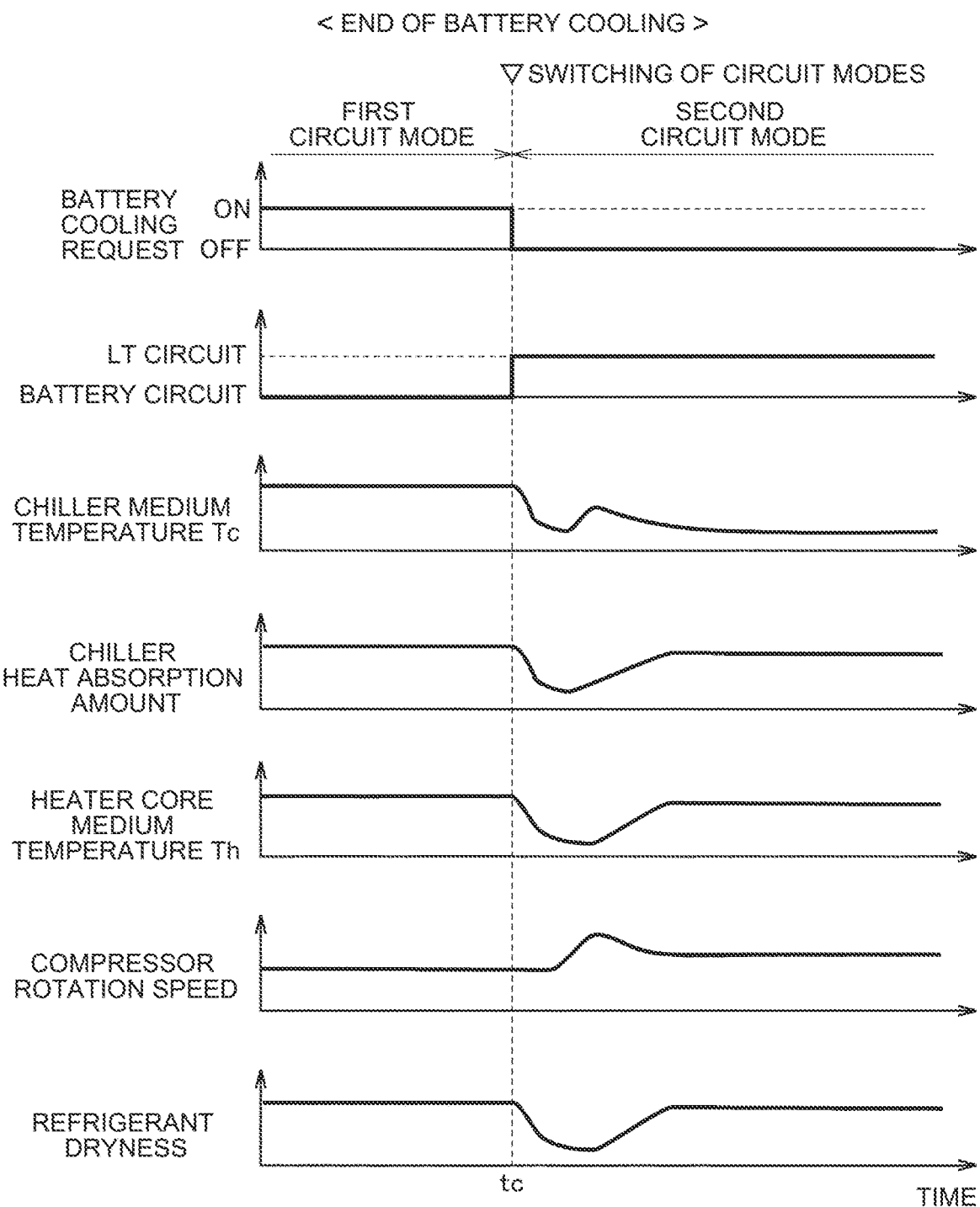
FIG. 5 is a time chart illustrating an example of a steep change in a chiller medium temperature at the end of battery cooling.

FIG. 5 is a time chart illustrating an example of the steep change in the chiller medium temperature Tc at the end of the cooling of the battery 163. The horizontal axis represents an elapsed period. The vertical axis represents, from top to bottom, ON/OFF of a cooling request for the battery 163, a circuit to which the chiller 142 is connected (LT circuit 130 or battery circuit 160), the chiller medium temperature Tc, the amount of heat absorbed from the heat medium by the chiller 142 (chiller heat absorption amount), the heater core medium temperature Th, the compressor rotation speed, and the dryness of the refrigerant at the inlet of the compressor 151 (refrigerant dryness).

At time tc, the cooling of the battery 163 ends and the cooling request for the battery 163 is switched from ON to OFF. Along with this, the thermal management system 1 is switched from the first circuit mode to the second circuit mode by controlling the five-way valve 180. Then, the heat medium flowing through the chiller 142 stops flowing through the battery 163 and instead flows through the LT radiator 122. Therefore, the chiller medium temperature Tc decreases steeply. Along with this, the chiller heat absorption amount decreases steeply, and therefore the heater core medium temperature Th decreases steeply. Thus, the temperature of the air (heating air) that is heated by the heater core 114 and blown into the vehicle cabin decreases. As a result, air conditioning comfort may deteriorate.

As described above, the compressor rotation speed is controlled based on the deviation between the target value and the current value of the temperature of the heating air at the air outlet. When the chiller heat absorption amount decreases steeply, the compressor rotation speed increases after detection of an increase in the deviation. That is, the increase in the compressor rotation speed is delayed with respect to the timing of switching from the first circuit mode to the second circuit mode. Therefore, it is difficult to suppress the steep decrease in the chiller heat absorption amount by adjusting the compressor rotation speed after the switching from the first circuit mode to the second circuit mode.

When the chiller heat absorption amount decreases steeply, the refrigerant dryness may decrease and the refrigerant may be incompletely evaporated by the chiller 142. That is, the refrigerant at the inlet of the compressor 151 may be in a gas-liquid phase mixed state (state in which the gas-phase refrigerant and the liquid-phase refrigerant are mixed). As a result, the compressor 151 may be damaged by compressing the liquid-phase refrigerant.

As described above, the thermal management system 1 may have the problems such as the deterioration of the air conditioning comfort and the damage to the compressor 151 when the first circuit mode is switched to the second circuit mode during the heating operation of the refrigeration cycle 150. In the first embodiment, a temperature difference $\Delta T$ between the chiller medium temperature Tc and the radiator medium temperature Tr is reduced by adjusting the compressor rotation speed prior to the switching from the first circuit mode to the second circuit mode. Hereinafter, this process will be referred to as "compressor control".

Figure 6:
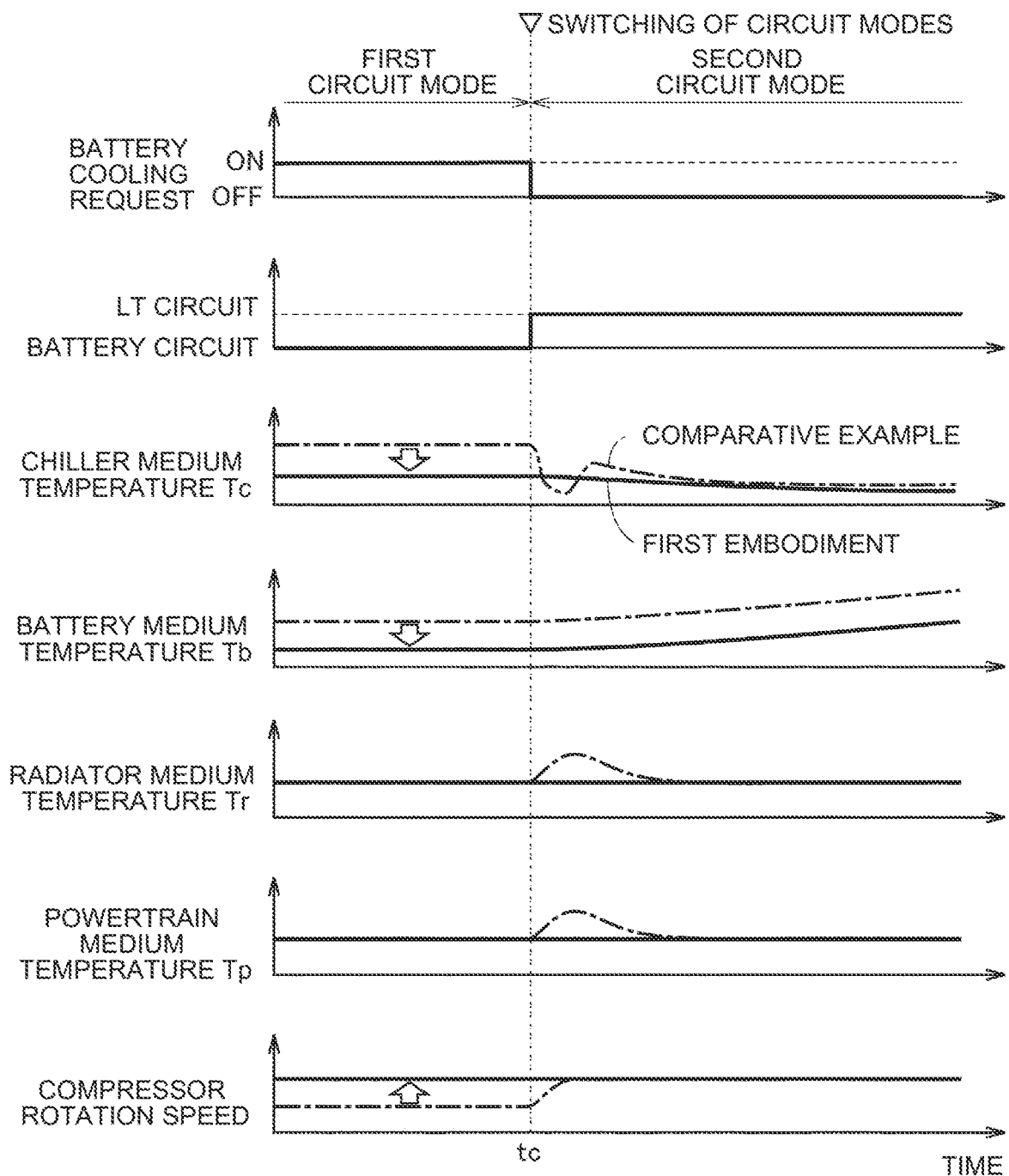
FIG. 6 is a time chart illustrating compressor control according to the first embodiment.

FIG. 6 is a time chart illustrating the compressor control according to the first embodiment. The horizontal axis represents an elapsed period. The vertical axis represents, from top to bottom, ON/OFF of the cooling request for the battery 163, a circuit to which the chiller 142 is connected (LT circuit 130 or battery circuit 160), the chiller medium temperature Tc, the battery medium temperature Tb, the radiator medium temperature Tr, the powertrain medium temperature Tp, and the compressor rotation speed.

Continuous lines indicate temporal changes in the parameters in the compressor control according to the first embodiment. To clarify the features of the compressor control according to the first embodiment, long dashed short dashed lines indicate temporal changes in the parameters in a comparative example.

In the example shown in FIG. 6, in the first circuit mode, the chiller medium temperature Tc is higher than the radiator medium temperature Tr, and the temperature difference $\Delta T$ (=Tc−Tr) between the chiller medium temperature Tc and the radiator medium temperature Tr is larger than a reference value REF1. In this case, the compressor rotation speed is set higher than that in the case where the temperature difference $\Delta T$ is smaller than the reference value REF1. When the compressor rotation speed is increased, the chiller heat absorption amount increases. Therefore, the chiller medium temperature Tc decreases and approaches the radiator medium temperature Tr. By bringing the chiller medium temperature Tc sufficiently close to the radiator medium temperature Tr in advance, it is possible to suppress the steep change in the chiller medium temperature Tc that may occur after the switching from the first circuit mode to the second circuit mode.

Although illustration is omitted, the chiller medium temperature Tc may be lower than the radiator medium temperature Tr, and the temperature difference $\Delta T$ (=Tr−Tc) between the chiller medium temperature Tc and the radiator medium temperature Tr may be larger than the reference value REF1. In this case, the compressor rotation speed is set lower than that in the case where the temperature difference $\Delta T$ is smaller than the reference value REF1. When the compressor rotation speed is reduced, the chiller heat absorption amount decreases. Therefore, the chiller medium temperature Tc increases and approaches the radiator medium temperature Tr. This also makes it possible to suppress the steep change in the chiller medium temperature Tc that may occur after the switching from the first circuit mode to the second circuit mode.

Figure 7:
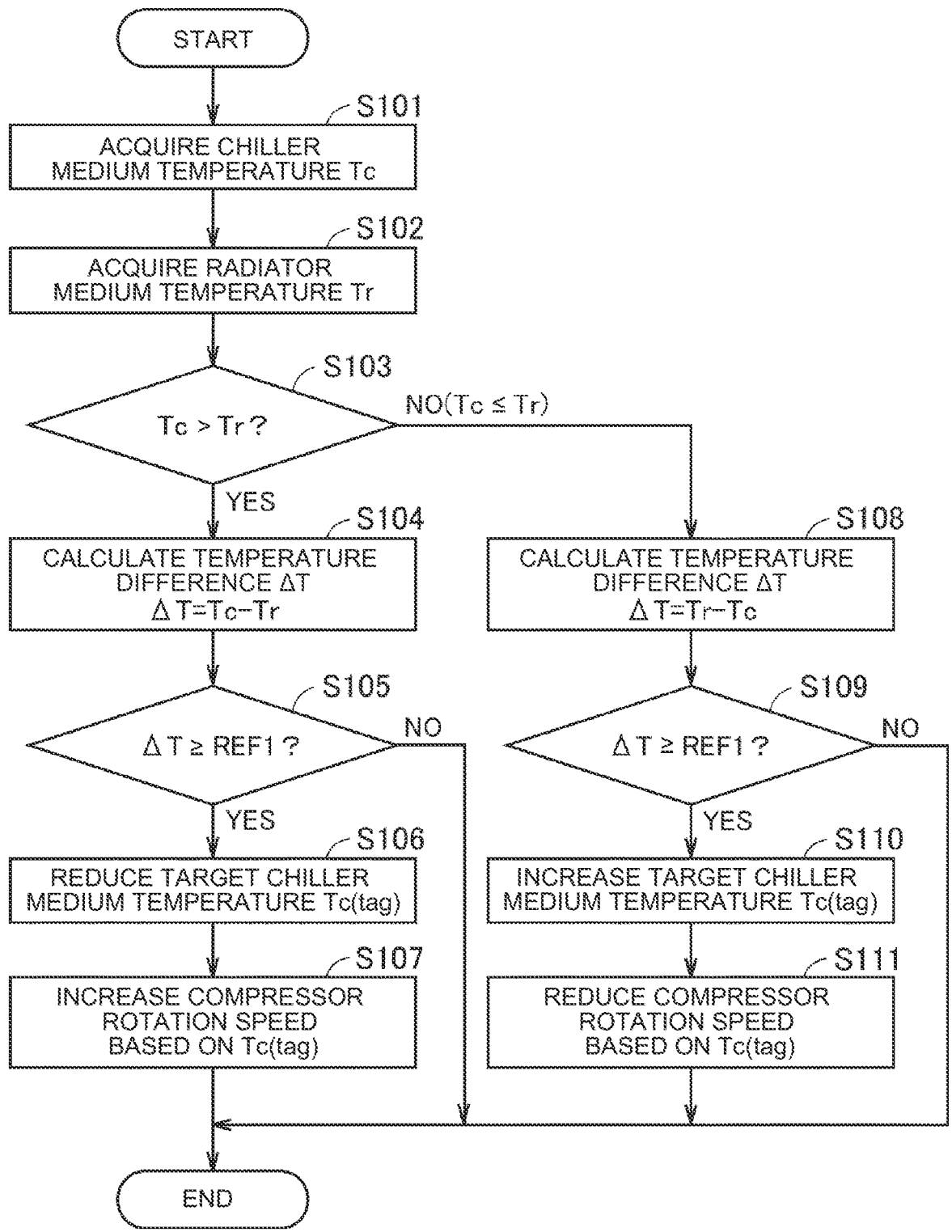
FIG. 7 is a flowchart showing a processing procedure of the compressor control according to the first embodiment.

FIG. 7 is a flowchart showing a processing procedure of the compressor control according to the first embodiment. The process shown in this flowchart is executed when a predetermined condition is satisfied (for example, every predetermined control cycle). The steps are implemented by software processing by the ECU 500, but may be implemented by hardware (electric circuit) in the ECU 500. Hereinafter, the term "step" is abbreviated as "S".

In S101, the ECU 500 acquires the chiller medium temperature Tc from the temperature sensor 193. The ECU 500 also acquires the radiator medium temperature Tr from the temperature sensor 192 (S102).

In S103, the ECU 500 determines whether the chiller medium temperature Tc is higher than the radiator medium temperature Tr. When the chiller medium temperature Tc is higher than the radiator medium temperature Tr (YES in S103), the ECU 500 subtracts the radiator medium temperature Tr from the chiller medium temperature Tc to calculate a heat medium/refrigerant temperature difference ΔT (ΔT=Tc−Tr) (S104).

In S105, the ECU 500 determines whether the heat medium/refrigerant temperature difference ΔT is equal to or larger than the reference value REF1. The reference value REF1 is such a value that the deterioration of the air conditioning comfort is sufficiently small when the temperature difference ΔT is smaller than the reference value REF1, and may be determined experimentally. When the temperature difference ΔT is equal to or larger than the reference value REF1 (YES in S105), the ECU 500 reduces a target chiller medium temperature Tc(tag) compared to the case where the temperature difference ΔT is smaller than the reference value REF1 (S106).

In S107, the ECU 500 increases the compressor rotation speed based on the target chiller medium temperature Tc(tag) set in S106. More specifically, the memory 502 of the ECU 500 stores, for example, a map that defines a correspondence among the target chiller medium temperature Tc(tag), the outside air temperature Ta, and the compressor rotation speed. The map defines such a correspondence that the compressor rotation speed increases as the target chiller medium temperature decreases. By referring to the map, the ECU 500 can calculate the compressor rotation speed from the target chiller medium temperature Tc(tag) and the outside air temperature Ta (detection result from the temperature sensor 196).

When the chiller medium temperature Tc is equal to or lower than the radiator medium temperature Tr in S103 (NO in S103), the ECU 500 subtracts the chiller medium temperature Tc from the radiator medium temperature Tr to calculate a heat medium/refrigerant temperature difference ΔT (ΔT=Tr−Tc) (S108).

In S109, the ECU 500 determines whether the heat medium/refrigerant temperature difference ΔT is equal to or larger than the reference value REF1. The reference value REF1 may differ between the process of S105 and the process of S109. When the temperature difference ΔT is equal to or larger than the reference value REF1 (YES in S105), the ECU 500 increases the target chiller medium temperature Tc(tag) compared to the case where the temperature difference ΔT is smaller than the reference value REF1 (S110). Then, the ECU 500 reduces the compressor rotation speed based on the target chiller medium temperature Tc(tag) (S111). This process may also be implemented by using, for example, a map as in the process of S107.

When the heat medium/refrigerant temperature difference ΔT is smaller than the reference value REF1 in S105 (NO in S105), the compressor rotation speed need not be adjusted. The same applies to a case where the temperature difference ΔT is smaller than the reference value REF1 in S109 (NO in S109).

In the first circuit mode (see FIG. 3), the radiator medium temperature Tr and the powertrain medium temperature Tp are approximately equal to each other. Therefore, for example, a temperature difference between the chiller medium temperature Tc and the powertrain medium temperature Tp may be used instead of the temperature difference ΔT between the chiller medium temperature Tc and the radiator medium temperature Tr.

As described above, in the first embodiment, the temperature difference ΔT between the chiller medium temperature Tc and the radiator medium temperature Tr is controlled to be smaller than the reference value REF1 by the compressor control prior to the switching from the first circuit mode to the second circuit mode along with the end of the cooling of the battery 163. In other words, the chiller medium temperature Tc is adjusted to sufficiently approach the radiator medium temperature Tr. According to the first embodiment, the steep change in the chiller medium temperature Tc along with the switching from the first circuit mode to the second circuit mode is suppressed. As a result, the deterioration of the air conditioning comfort can be suppressed and the damage to the compressor 151 can be prevented.

Second Embodiment

The first embodiment illustrates the configuration in which the steep change in the chiller medium temperature Tc is suppressed by the compressor control. A second embodiment illustrates a configuration in which the steep change in the chiller medium temperature Tc is suppressed by controlling the output of the electric heater 112. Hereinafter, this control will be referred to as "heater control".

Figure 8:
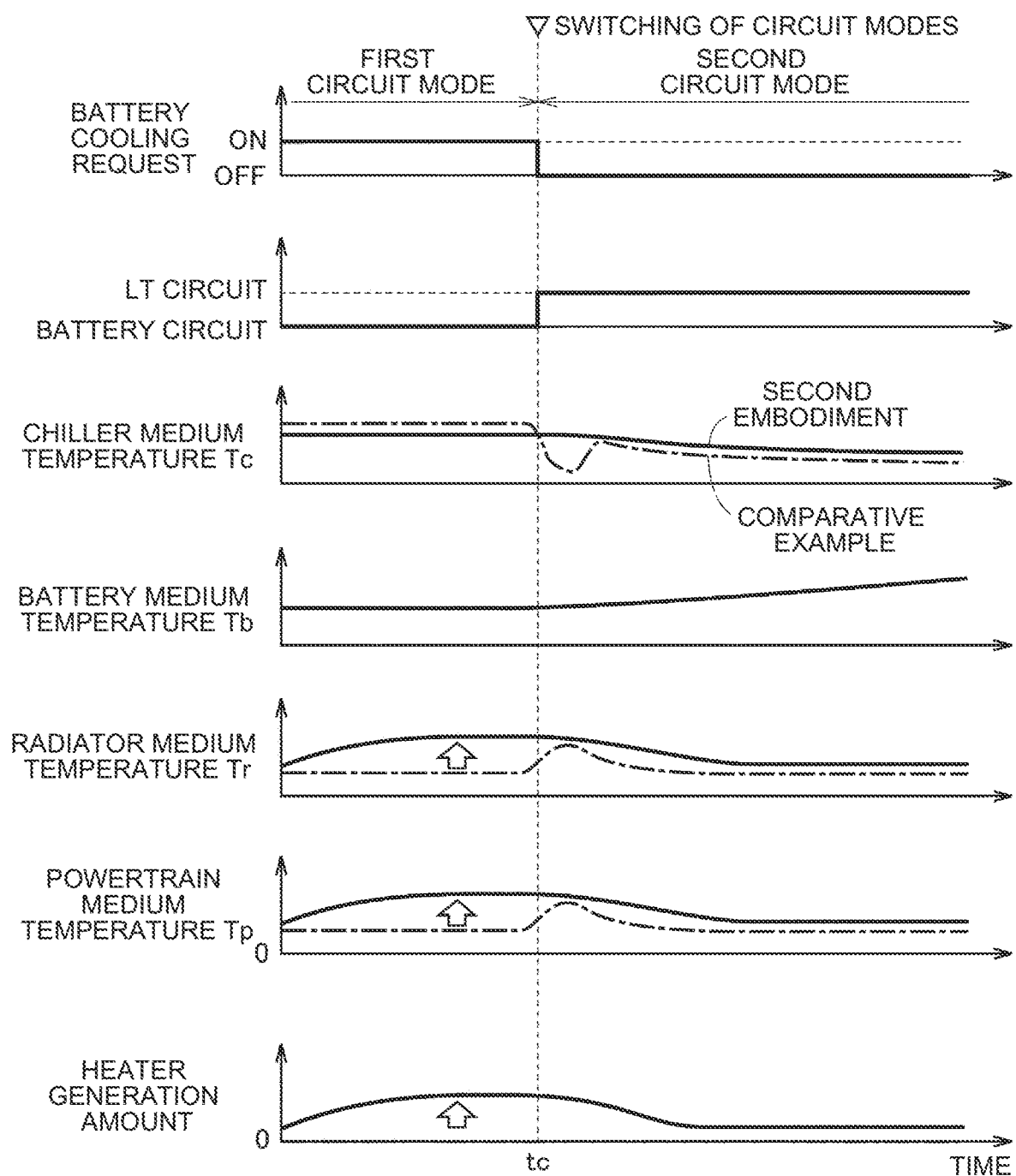
FIG. 8 is a time chart illustrating heater control according to a second embodiment.

FIG. 8 is a time chart illustrating the heater control according to the second embodiment. The horizontal axis represents an elapsed period. The vertical axis represents, from top to bottom, ON/OFF of the cooling request for the battery 163, a circuit to which the chiller 142 is connected (LT circuit 130 or battery circuit 160), the chiller medium temperature Tc, the battery medium temperature Tb, the radiator medium temperature Tr, the powertrain medium temperature Tp, and the amount of heat generated by the electric heater 112 per unit time (heater generation amount). The same applies to FIG. 13 to be described later.

When the chiller medium temperature Tc is higher than the radiator medium temperature Tr and the temperature difference ΔT between the chiller medium temperature Tc and the radiator medium temperature Tr is larger than the reference value REF1 in the first circuit mode, the heater generation amount is set larger than that in the case where the temperature difference ΔT is smaller than the reference value REF1. The electric heater 112 may be stopped when the temperature difference ΔT is smaller than the reference value REF1, and the electric heater 112 may be operated when the temperature difference ΔT is larger than the reference value REF1.

When the heater generation amount is increased, the radiator medium temperature Tr increases. Therefore, the temperature difference ΔT between the chiller medium temperature Tc and the radiator medium temperature Tr decreases. By sufficiently reducing the temperature difference ΔT in advance of the switching from the first circuit mode to the second circuit mode, it is possible to suppress the steep change in the chiller medium temperature Tc after the switching of the circuit modes.

Although illustration is omitted, the chiller medium temperature Tc may be lower than the radiator medium temperature Tr, and the temperature difference ΔT between the chiller medium temperature Tc and the radiator medium temperature Tr may be larger than the reference value REF1. In this case, the heater generation amount is set smaller than that in the case where the temperature difference ΔT is smaller than the reference value REF1. The electric heater 112 may be operated when the temperature difference ΔT is smaller than the reference value REF1, and the electric heater 112 may be stopped when the temperature difference ΔT is larger than the reference value REF1.

When the heater generation amount is reduced, the radiator medium temperature Tr decreases. Therefore, the temperature difference ΔT between the chiller medium temperature Tc and the radiator medium temperature Tr decreases. This also makes it possible to suppress the steep change in the chiller medium temperature Tc after the switching from the first circuit mode to the second circuit mode.

Figure 9:
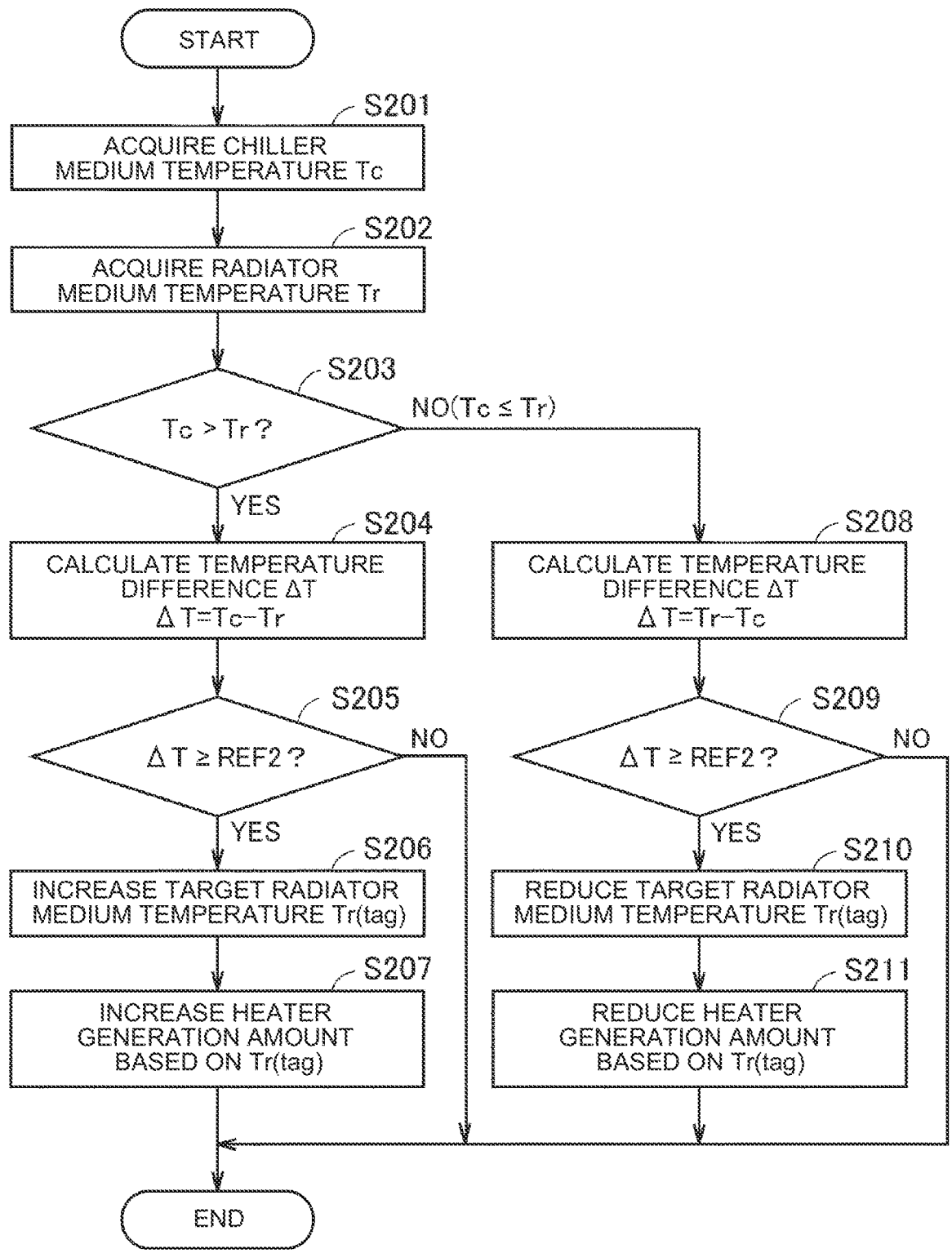
FIG. 9 is a flowchart showing a processing procedure of the heater control according to the second embodiment.

FIG. 9 is a flowchart showing a processing procedure of the heater control according to the second embodiment. Processes of S201 to S205, S208, S209 are the same as the processes of S101 to S105, S108, S109 in the first embodiment (see FIG. 7).

When the chiller medium temperature Tc is higher than the radiator medium temperature Tr in S203 (YES in S203), the ECU 500 subtracts the radiator medium temperature Tr from the chiller medium temperature Tc to calculate the heat medium/refrigerant temperature difference $\Delta T$ ($\Delta T=Tc-Tr$) (S204). When the chiller medium temperature Tc is equal to or lower than the radiator medium temperature Tr (NO in S203), the ECU 500 subtracts the chiller medium temperature Tc from the radiator medium temperature Tr to calculate the temperature difference $\Delta T$ ($\Delta T=Tr-Tc$) (S208).

In S205, the ECU 500 determines whether the heat medium/refrigerant temperature difference $\Delta T$ is equal to or larger than a reference value REF2. When the temperature difference $\Delta T$ is equal to or larger than the reference value REF2 (YES in S205), the ECU 500 increases a target radiator medium temperature Tr(tag) compared to a case where the temperature difference $\Delta T$ is smaller than the reference value REF2 (S206).

In S207, the ECU 500 increases the heater generation amount based on the target radiator medium temperature Tr(tag) set in S206. For example, the ECU 500 refers to a map that defines a correspondence among the target radiator medium temperature Tr(tag), the outside air temperature Ta, and the heater generation amount, and calculates the heater generation amount based on the target radiator medium temperature Tr(tag) and the outside air temperature Ta.

In S209, the ECU 500 determines whether the heat medium/refrigerant temperature difference $\Delta T$ is equal to or larger than the reference value REF2. When the temperature difference $\Delta T$ is equal to or larger than the reference value REF2 (YES in S209), the ECU 500 reduces the target radiator medium temperature Tr(tag) compared to the case where the temperature difference $\Delta T$ is smaller than the reference value REF2 (S210). Then, the ECU 500 reduces the heater generation amount based on the target radiator medium temperature Tr(tag) (S211). This process may also be implemented by using, for example, a map as in the process of S207.

As described above, in the second embodiment, the temperature difference $\Delta T$ between the chiller medium temperature Tc and the radiator medium temperature Tr is controlled to be smaller than the reference value REF2 by the heater control prior to the switching from the first circuit mode to the second circuit mode along with the end of the cooling of the battery 163. In other words, the radiator medium temperature Tr is adjusted to sufficiently approach the chiller medium temperature Tc. According to the second embodiment, the steep change in the chiller medium temperature Tc along with the switching from the first circuit mode to the second circuit mode is suppressed. As a result, the deterioration of the air conditioning comfort can be suppressed.

Modification of Second Embodiment

Instead of or in addition to the control on the output of the electric heater 112, the steep change in the chiller medium temperature Tc may be suppressed by controlling a powertrain (PCU 133 and motor generator). Hereinafter, this control will be referred to as "powertrain control".

The powertrain control is control for intentionally driving the powertrain in a state of a large heat loss. More specifically, field strengthening control or field weakening control on the motor generator may be executed so that an operating point of the motor generator expressed on a current advance-torque plane deviates from an optimum operating line on which the heat loss is minimum. For details of the control for increasing the heat loss of the powertrain, reference may be made to, for example, Japanese Unexamined Patent Application Publication No. 2018-98857 (JP 2018-98857 A).

Figure 10:
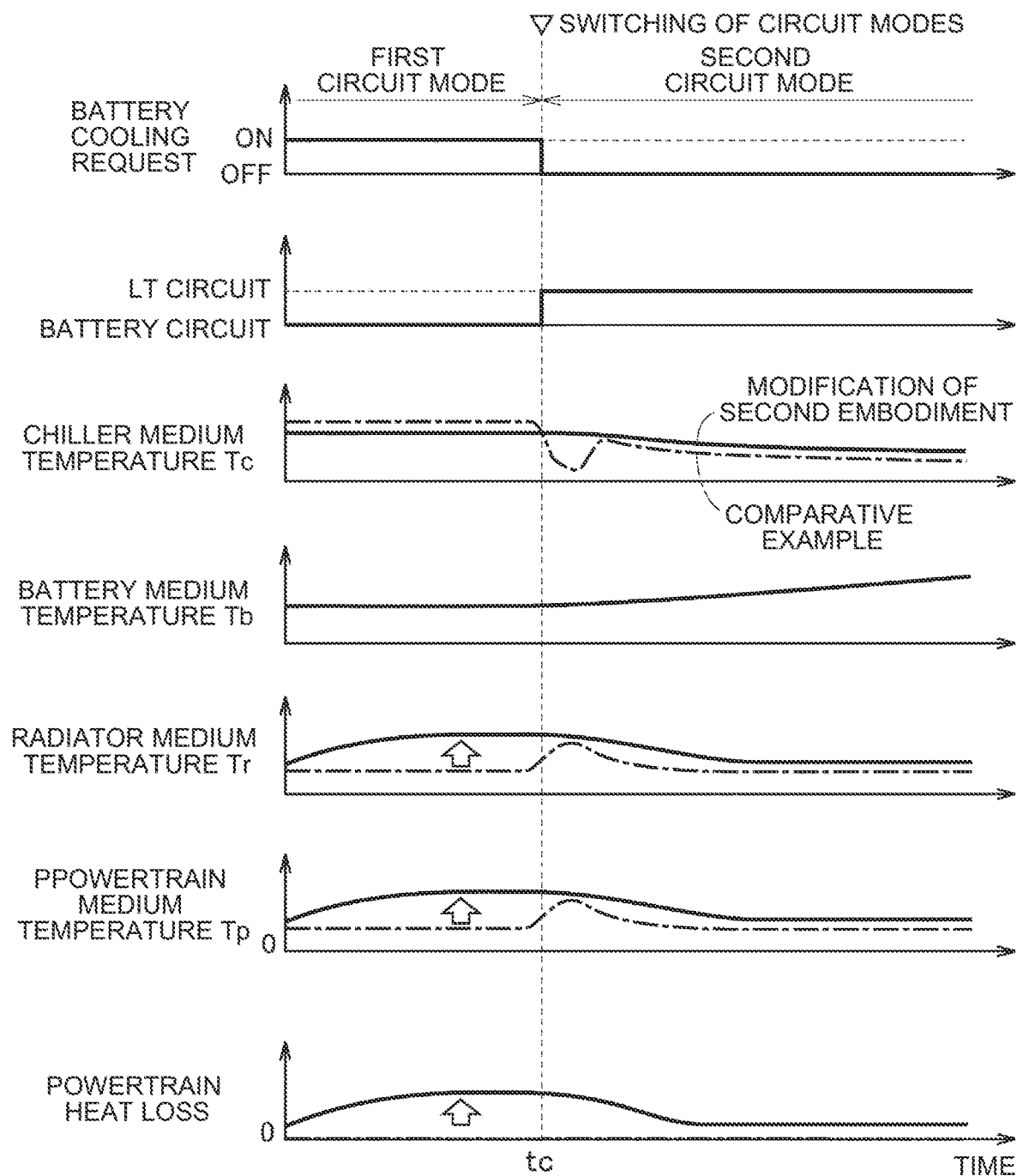
FIG. 10 is a time chart illustrating powertrain control according to a modification of the second embodiment.

FIG. 10 is a time chart illustrating the powertrain control according to the modification of the second embodiment. This time chart differs from the time chart of FIG. 8 in that the heat loss of the powertrain per unit time (powertrain heat loss) is provided at the bottom of the vertical axis instead of the heater generation amount.

When the chiller medium temperature Tc is higher than the radiator medium temperature Tr and the temperature difference $\Delta T$ between the chiller medium temperature Tc and the radiator medium temperature Tr is larger than the reference value REF1 in the first circuit mode, the powertrain heat loss is set larger than that in the case where the temperature difference $\Delta T$ is smaller than the reference value REF1. When the powertrain heat loss is increased, the powertrain medium temperature Tp increases. Accordingly, the radiator medium temperature Tr increases. Therefore, the temperature difference $\Delta T$ between the chiller medium temperature Tc and the radiator medium temperature Tr decreases. By sufficiently reducing the temperature difference $\Delta T$ in advance of the switching from the first circuit mode to the second circuit mode, it is possible to suppress the steep change in the chiller medium temperature Tc after the switching from the first circuit mode to the second circuit mode.

Figure 11:
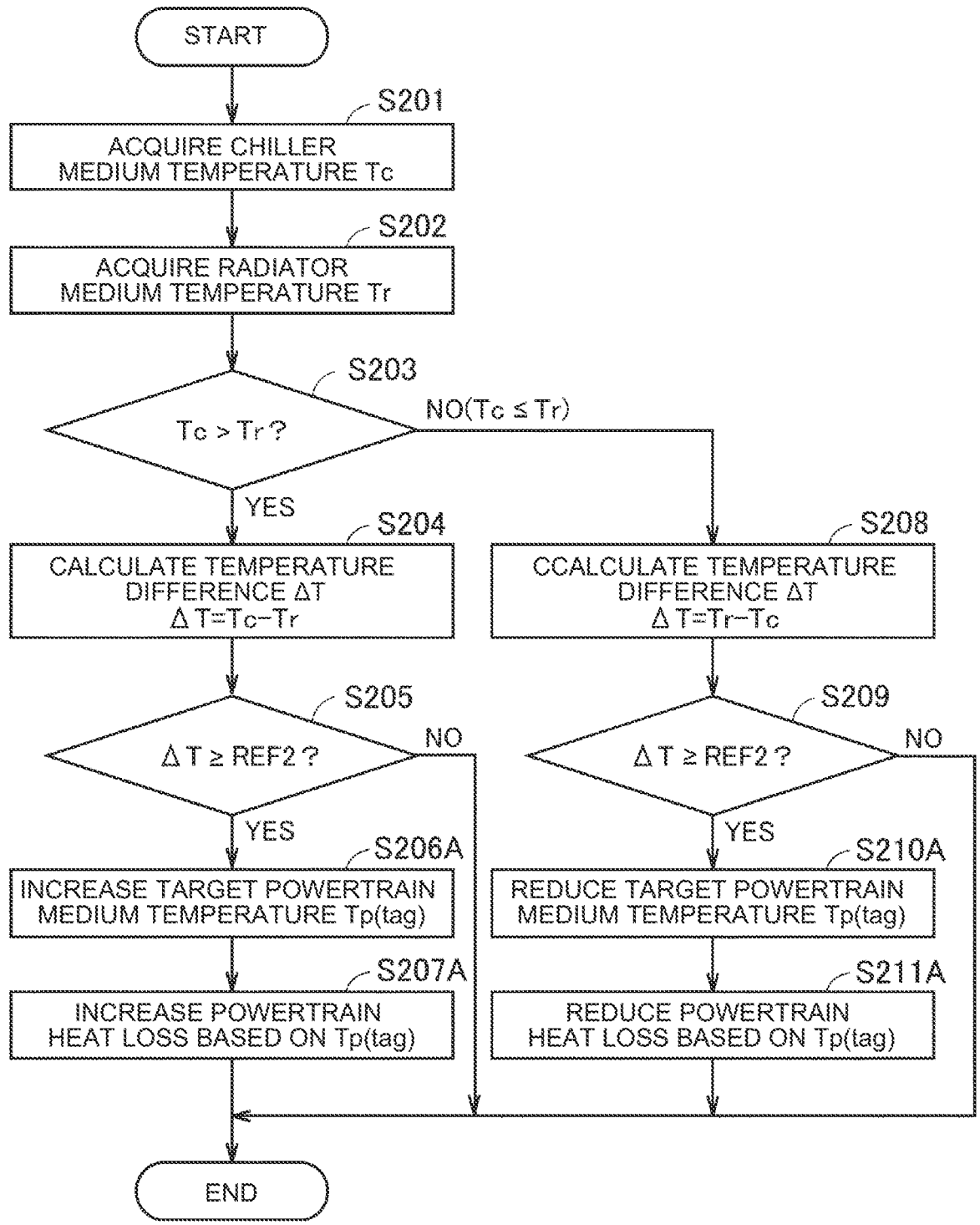
FIG. 11 is a flowchart showing a processing procedure of the powertrain control according to the second embodiment.

FIG. 11 is a flowchart showing a processing procedure of the powertrain control according to the second embodiment. This flowchart differs from the flowchart of FIG. 9 in that processes of S206A, S207A, S210A, S211A are included instead of the processes of S206, S207, S210, S211.

When the heat medium/refrigerant temperature difference $\Delta T$ is equal to or larger than the reference value REF2 in S205 (YES in S205), the ECU 500 increases a target powertrain medium temperature Tp(tag) compared to the case where the temperature difference $\Delta T$ is smaller than the reference value REF2 (S206A). Then, the ECU 500 increases the powertrain heat loss based on the target powertrain medium temperature Tp(tag) set in S206A.

When the heat medium/refrigerant temperature difference $\Delta T$ is equal to or larger than the reference value REF2 in S209 (YES in S209), the ECU 500 reduces the target powertrain medium temperature Tp(tag) compared to the case where the temperature difference $\Delta T$ is smaller than the reference value REF2 (S210A). Then, the ECU 500 reduces the powertrain heat loss based on the target powertrain medium temperature Tp(tag) (S211A). The processes of S207A. S211A may be implemented by using, for example, maps as in the processes of S207, S211. When the operating point of the motor generator is normally controlled on the optimum operating line on which the heat loss is minimum, the processes of S208 to S211A may be omitted.

Third Embodiment

The first and second embodiments illustrate the situation where the chiller medium temperature Tc steeply changes at the time of switching from the first circuit mode to the second circuit mode, in other words, at the end of the cooling of the battery 163. Conversely, the chiller medium temperature Tc may also steeply change at the time of switching from the second circuit mode to the first circuit mode, that is, at the start of the cooling of the battery 163. A third embodiment illustrates such a situation.

Figure 12:
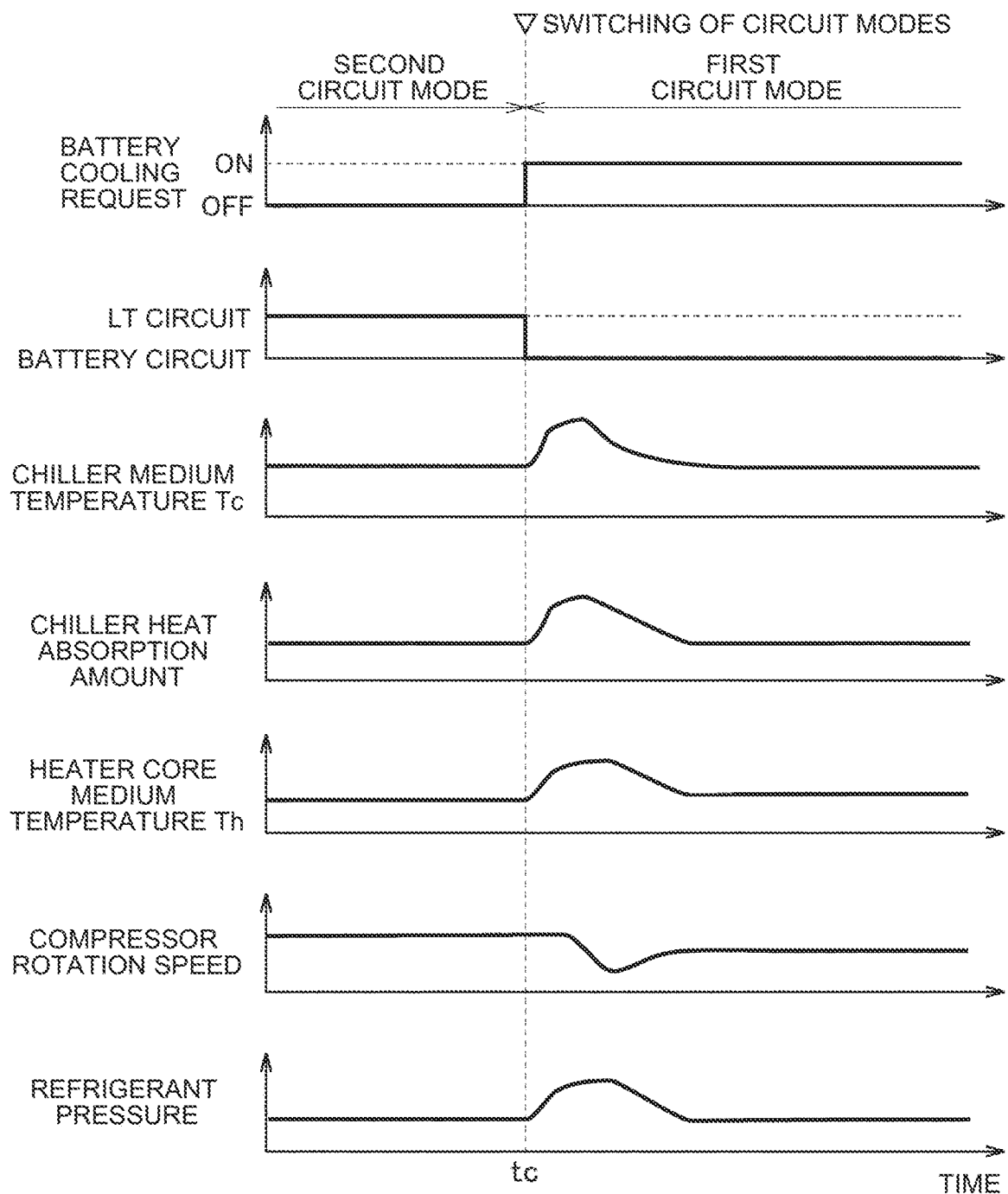
FIG. 12 is a time chart illustrating an example of a steep change in the chiller medium temperature at the start of the battery cooling.

FIG. 12 is a time chart illustrating an example of the steep change in the chiller medium temperature Tc at the start of the cooling of the battery 163. The horizontal axis represents an elapsed period. The vertical axis represents, from top to bottom, ON/OFF of the cooling request for the battery 163, a circuit to which the chiller 142 is connected (LT circuit 130 or battery circuit 160), the chiller medium temperature Tc, the amount of heat absorbed from the heat medium by the chiller 142 (chiller heat absorption amount), the heater core medium temperature Th, the compressor rotation speed, and the pressure of the refrigerant at the outlet of the compressor 151 (refrigerant pressure).

At time tc, the cooling request for the battery 163 is switched from OFF to ON. Along with this, the thermal management system 1 is switched from the second circuit mode to the first circuit mode by controlling the five-way valve 180. Then, the heat medium flowing through the chiller 142 stops flowing through the LT radiator 122 and instead flows through the battery 163. Therefore, the chiller medium temperature Tc approaches the battery medium temperature Tb. When the temperature difference between the chiller medium temperature Tc and the battery medium temperature Tb is large before the switching from the second circuit mode to the first circuit mode, the chiller medium temperature Tc may steeply increase after the switching.

Along with the steep increase in the chiller medium temperature Tc, the chiller heat absorption amount increases steeply, and therefore the heater core medium temperature Th increases steeply. Then, the temperature of the air (heating air) that is heated by the heater core 114 and blown into the vehicle cabin increases. As a result, air conditioning comfort may deteriorate. The compressor rotation speed decreases with a delay with respect to the timing of switching from the second circuit mode to the first circuit mode. When the chiller heat absorption amount increases steeply, all the refrigerant in the chiller 142 turns into the gas-phase refrigerant to further increase the pressure of the gas-phase refrigerant. Thus, the pressure of the refrigerant at the outlet of the compressor 151 may increase excessively. As a result, the components of the refrigeration cycle 150 (compressor 151, expansion valves 152, 155, etc.) may be damaged.

As described above, the thermal management system 1 may have the problems such as the deterioration of the air conditioning comfort and the damage to the components of the refrigeration cycle 150 when the second circuit mode is switched to the first circuit mode during the heating operation of the refrigeration cycle 150. In the third embodiment, heater control is executed prior to the switching from the second circuit mode to the first circuit mode. Powertrain control may be executed instead of or in addition to the heater control.

Figure 13:
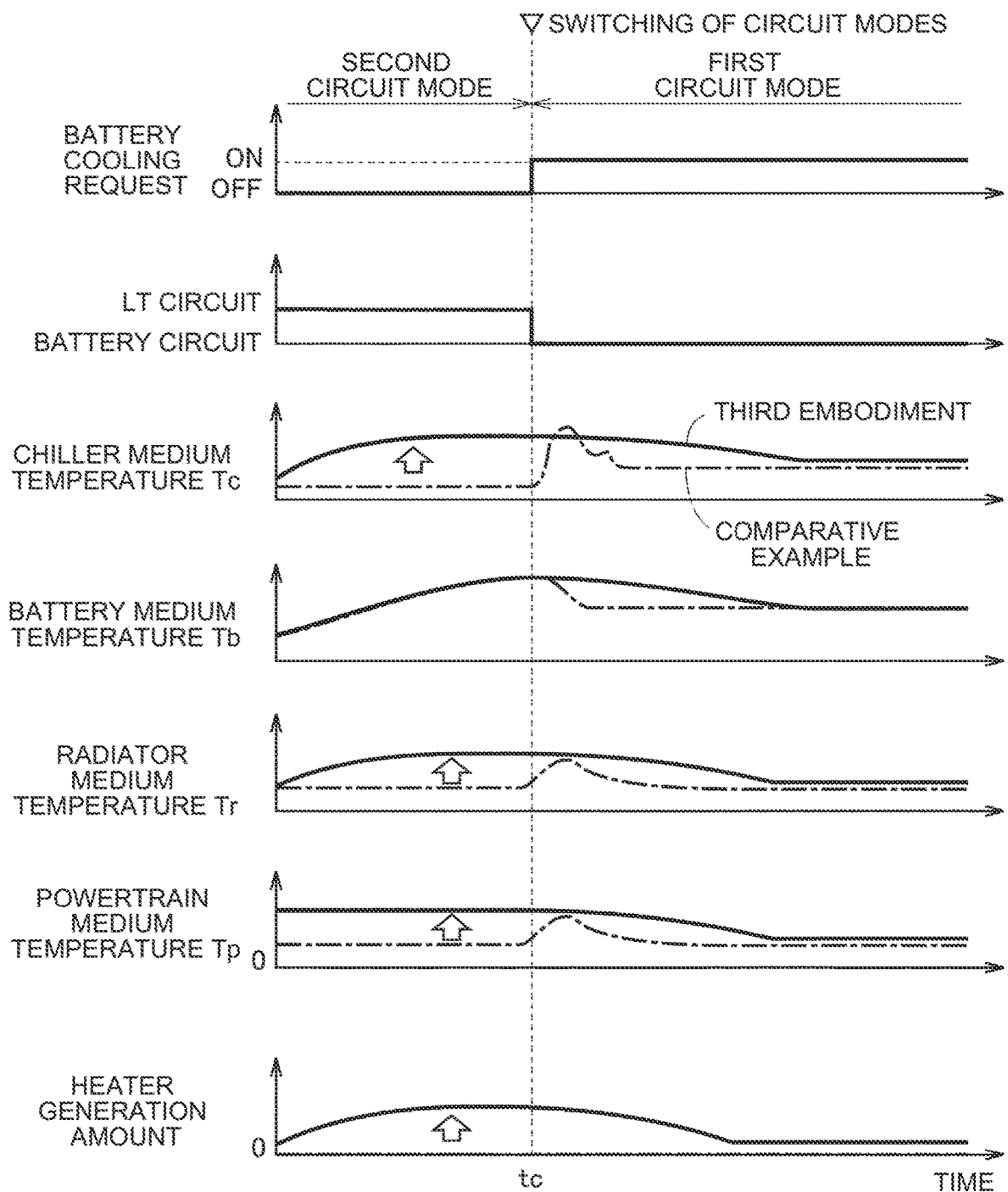
FIG. 13 is a time chart illustrating heater control according to a third embodiment.

FIG. 13 is a time chart illustrating the heater control according to the third embodiment. When the chiller medium temperature Tc is higher than the radiator medium temperature Tr and the temperature difference ΔT between the chiller medium temperature Tc and the radiator medium temperature Tr is larger than a reference value REF3 in the second circuit mode, the heater generation amount is set larger than that in a case where the temperature difference ΔT is smaller than the reference value REF3.

When the heater generation amount is increased in the second circuit mode, not only the radiator medium temperature Tr and the powertrain medium temperature Tp but also the chiller medium temperature Tc increases. Then, the chiller medium temperature Tc approaches the battery medium temperature Tb before the switching from the second circuit mode to the first circuit mode (that is, before the cooling). By sufficiently reducing the temperature difference between the chiller medium temperature Tc and the battery medium temperature Tb before the switching of the circuit modes, it is possible to suppress the steep increase in the chiller medium temperature Tc after the switching of the circuit modes.

Although illustration is omitted, the chiller medium temperature Tc may be lower than the radiator medium temperature Tr, and the temperature difference ΔT between the chiller medium temperature Tc and the radiator medium temperature Tr may be larger than the reference value REF1. In this case, the heater generation amount is set smaller than that in the case where the temperature difference ΔT is smaller than the reference value REF1. When the heater generation amount is reduced, the radiator medium temperature Tr decreases. Therefore, the temperature difference ΔT between the chiller medium temperature Tc and the radiator medium temperature Tr decreases. This also makes it possible to suppress the steep change in the chiller medium temperature Tc after the switching from the second circuit mode to the first circuit mode.

Figure 14:
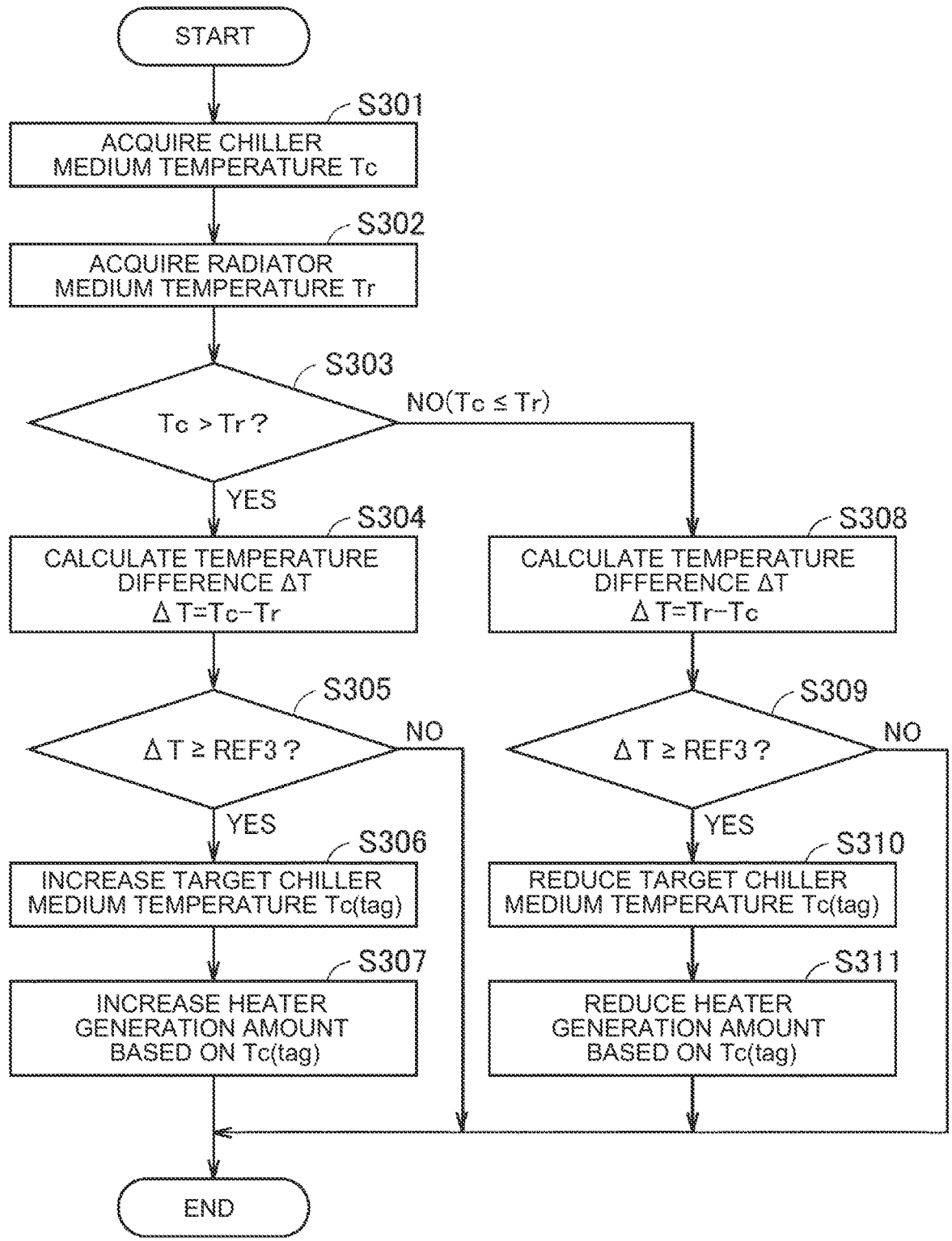
FIG. 14 is a flowchart showing a processing procedure of the heater control according to the third embodiment.

FIG. 14 is a flowchart showing a processing procedure of the heater control according to the third embodiment. Processes of S301 to S304, S308, S309 are the same as the processes of S201 to S204, S208, S209 in the second embodiment (see FIG. 9).

In S305, the ECU 500 determines whether the heat medium/refrigerant temperature difference ΔT (=Tc−Tr) is equal to or larger than the reference value REF3. When the temperature difference ΔT is equal to or larger than the reference value REF3 (YES in S305), the ECU 500 increases the target chiller medium temperature Tc(tag) compared to the case where the temperature difference ΔT is smaller than the reference value REF3 (S306).

In S307, the ECU 500 increases the heater generation amount based on the target chiller medium temperature Tc(tag) set in S306. For example, the ECU 500 refers to a map that defines a correspondence among the target chiller medium temperature Tc(tag), the outside air temperature Ta, and the heater generation amount, and calculates the heater generation amount based on the target chiller medium temperature Tc(tag) and the outside air temperature Ta.

In S309, the ECU 500 determines whether the heat medium/refrigerant temperature difference ΔT (=Tr−Tc) is equal to or larger than the reference value REF3. When the temperature difference ΔT is equal to or larger than the reference value REF3 (YES in S309), the ECU 500 reduces the target chiller medium temperature Tc(tag) compared to the case where the temperature difference ΔT is smaller than the reference value REF3 (S310). Then, the ECU 500 reduces the heater generation amount based on the target chiller medium temperature Tc(tag) (S311). This process may also be implemented by using, for example, a map as in the process of S307.

After a sufficient period has elapsed in the second circuit mode, the battery medium temperature Tb, the radiator medium temperature Tr, and the powertrain medium temperature Tp are approximately equal to each other. Therefore, a temperature difference between the chiller medium temperature Tc and the battery medium temperature Tb or a temperature difference between the chiller medium temperature Tc and the powertrain medium temperature Tp may be used instead of the temperature difference ΔT between the chiller medium temperature Tc and the radiator medium temperature Tr.

As described above, in the third embodiment, the temperature difference ΔT between the chiller medium temperature Tc and the radiator medium temperature Tr is controlled to be smaller than the reference value REF3 by the heater control prior to the switching from the second circuit mode to the first circuit mode along with the start of the cooling of the battery 163. In other words, the radiator medium temperature Tr is adjusted to sufficiently approach the chiller medium temperature Tc. According to the third embodiment, the steep change in the chiller medium temperature Tc along with the switching from the second circuit mode to the first circuit mode can be suppressed. As a result, the deterioration of the air conditioning comfort can be suppressed. Since the steep increase in the chiller heat absorption amount is suppressed, the damage to the components of the refrigeration cycle 150 can be prevented.

Modification of Third Embodiment

Figure 15:
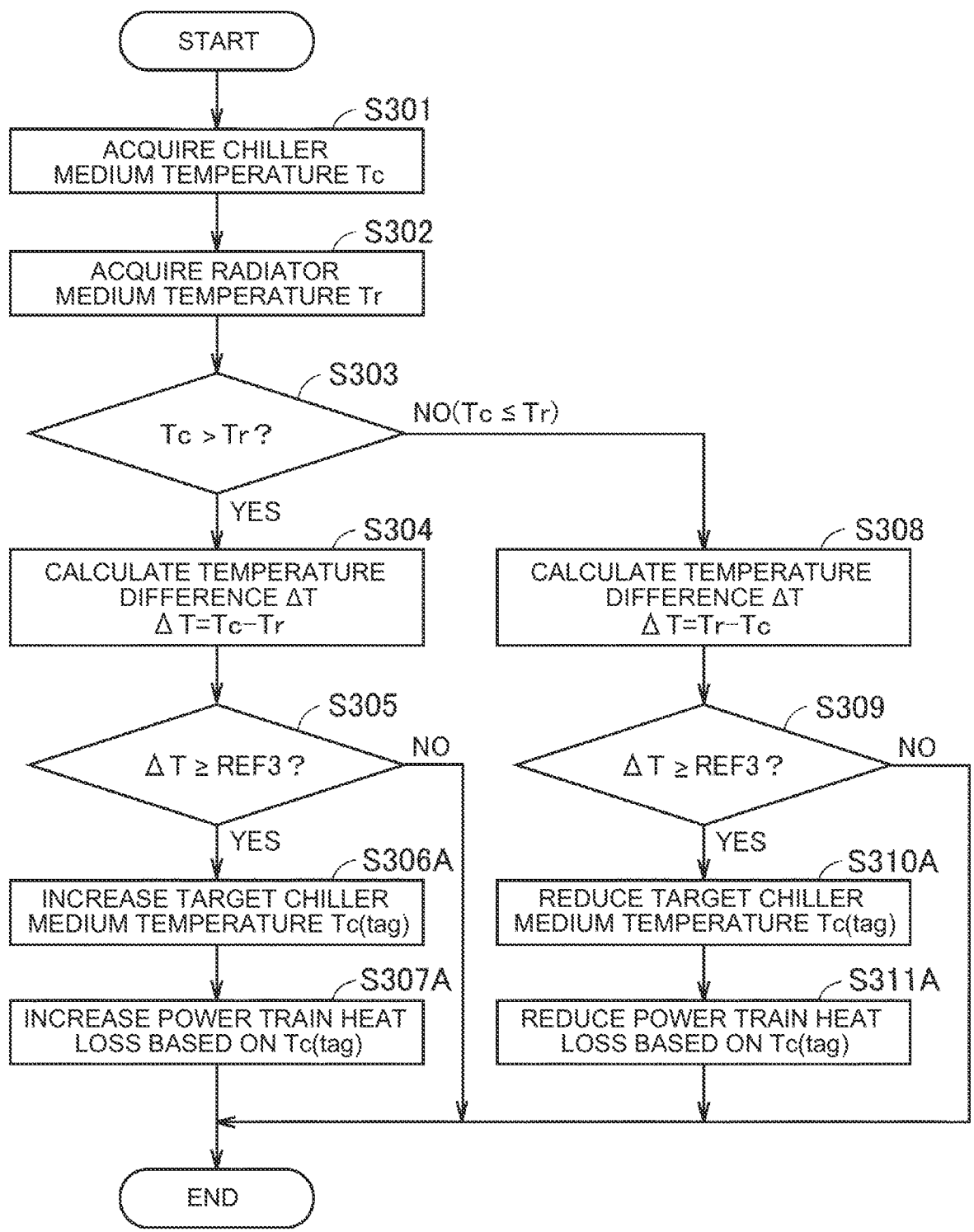
FIG. 15 is a flowchart showing a processing procedure of powertrain control according to a modification of the third embodiment.

FIG. 15 is a flowchart showing a processing procedure of powertrain control according to a modification of the third embodiment. This flowchart differs from the flowchart of FIG. 14 in that processes of S306A, S307A, S310A, S311A are included instead of the processes of S306, S307, S310, S311.

When the heat medium/refrigerant temperature difference ΔT is equal to or larger than the reference value REF3 in S305 (YES in S305), the ECU 500 increases the target chiller medium temperature Tc(tag) compared to the case where the temperature difference ΔT is smaller than the reference value REF3 (S306A). Then, the ECU 500 increases the powertrain heat loss in S307A based on the target chiller medium temperature Tc(tag) set in S306A.

When the heat medium/refrigerant temperature difference ΔT is equal to or larger than the reference value REF3 in S309 (YES in S309), the ECU 500 reduces the target chiller medium temperature Tc(tag) compared to the case where the temperature difference ΔT is smaller than the reference value REF3 (S310A). Then, the ECU 500 reduces the powertrain heat loss based on the target chiller medium temperature Tc(tag) (S311A). The processes of S307A, S311A may be implemented by using, for example, maps as in the processes of S307, S311. As in the modification of the second embodiment, the processes of S308 to S311A may be omitted.

Fourth Embodiment

Fourth and fifth embodiments illustrate thermal management circuits having configurations different from the configurations described in the first to third embodiments. The overall configuration of the thermal management system is the same as the configuration shown in FIG. 1.

Figure 16:
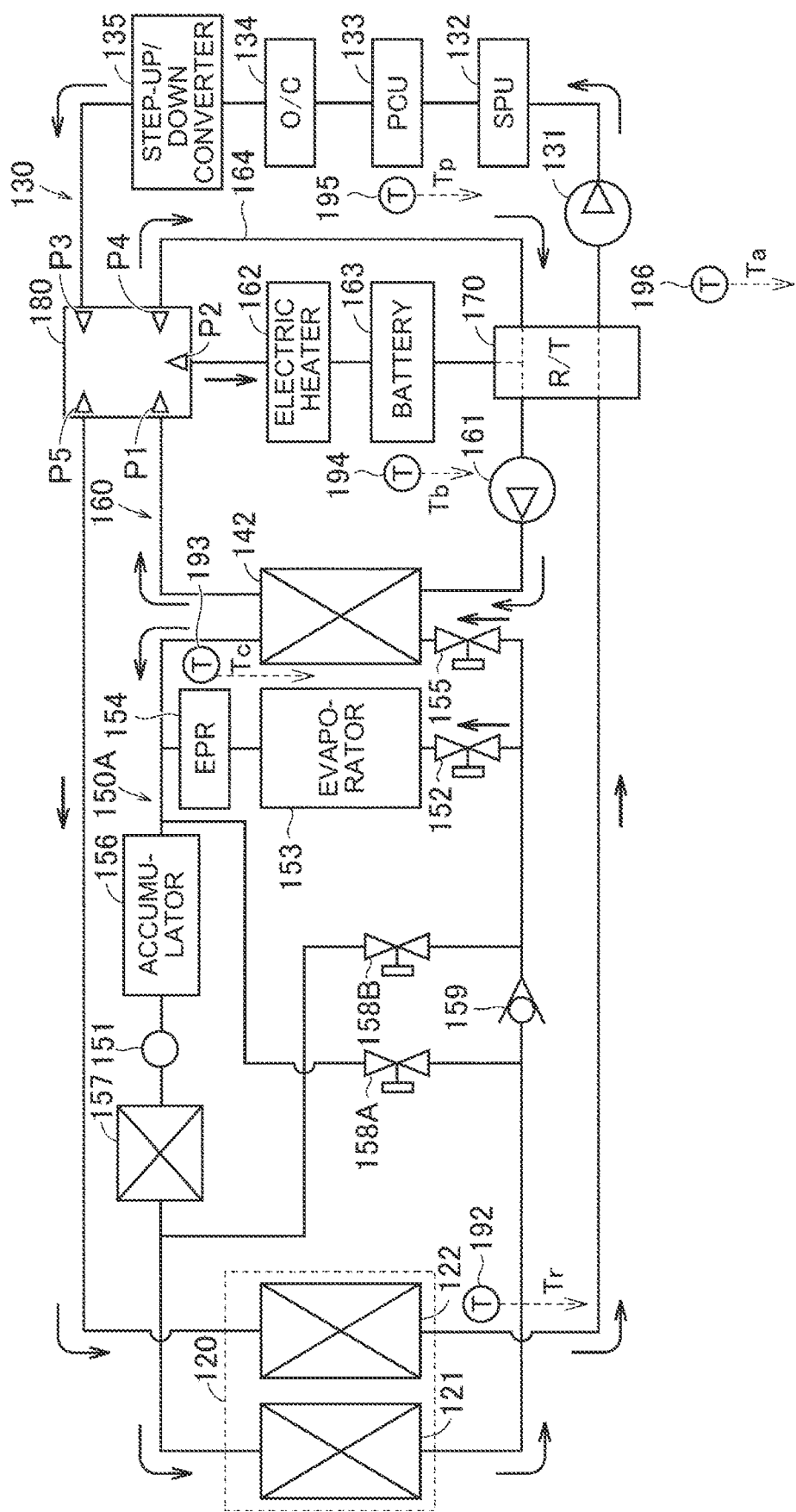
FIG. 16 shows the configuration of a thermal management circuit according to a fourth embodiment.

FIG. 16 shows the configuration of the thermal management circuit according to the fourth embodiment. A thermal management circuit 100A shown in FIG. 16 differs from the thermal management circuit 100 shown in FIG. 2 in that the thermal management circuit 100A does not include the HT circuit 110 (water pump 111, electric heater 112, three-way valve 113, heater core 114, reservoir tank 115) and the temperature sensor 191 and includes a refrigeration cycle 150A instead of the refrigeration cycle 150. The refrigeration cycle 150A differs from the refrigeration cycle 150 in that the refrigeration cycle 150A further includes an accumulator 156, an indoor condenser 157, expansion valves 158A and 158B, and a check valve 159.

The accumulator 156 is connected upstream of the compressor 151 (refrigerant input side). The accumulator 156 separates the liquid-phase refrigerant and the gas-phase refrigerant, and causes the compressor 151 to suck only the gas-phase refrigerant.

The indoor condenser 157 is connected downstream of the compressor 151 (refrigerant output side). The indoor condenser 157 heats air by exchanging heat between the air and the refrigerant flowing therein.

The expansion valve 158A is connected to a pipe branching from an upstream side of the accumulator 156 and leading to an upstream side of the check valve 159. The expansion valve 158A decompresses and expands the refrigerant that has passed through the chiller 142 and/or the EPR 154, and outputs the refrigerant to the check valve 159.

The expansion valve 158B is connected to a pipe branching from a downstream side of the indoor condenser 157 and leading to a downstream side of the check valve 159. The expansion valve 158B expands the high-pressure liquid-phase refrigerant that has passed through the indoor condenser 157 to change it into low-temperature and low-pressure wet vapor in a gas-liquid mixed state.

The check valve 159 is connected between the HT radiator 121 and the expansion valve 152 (between the HT radiator 121 and the expansion valve 155). The check valve 159 allows a flow of the refrigerant output from the HT radiator 121 and prohibits a reverse flow.

In the system configuration employing the thermal management circuit 100A, the ECU 500 may execute the compressor control described in the first embodiment (see FIG. 7) or the powertrain control in the modification of the second embodiment (see FIG. 11). The ECU 500 may execute the powertrain control described in the modification of the third embodiment (see FIG. 15). Since these controls have already been described in detail, the description will not be repeated.

According to the fourth embodiment, the steep change in the chiller medium temperature Tc is suppressed as in the first to third embodiments (or their modifications). As a result, the deterioration of the air conditioning comfort can be suppressed.

Fifth Embodiment

Figure 17:
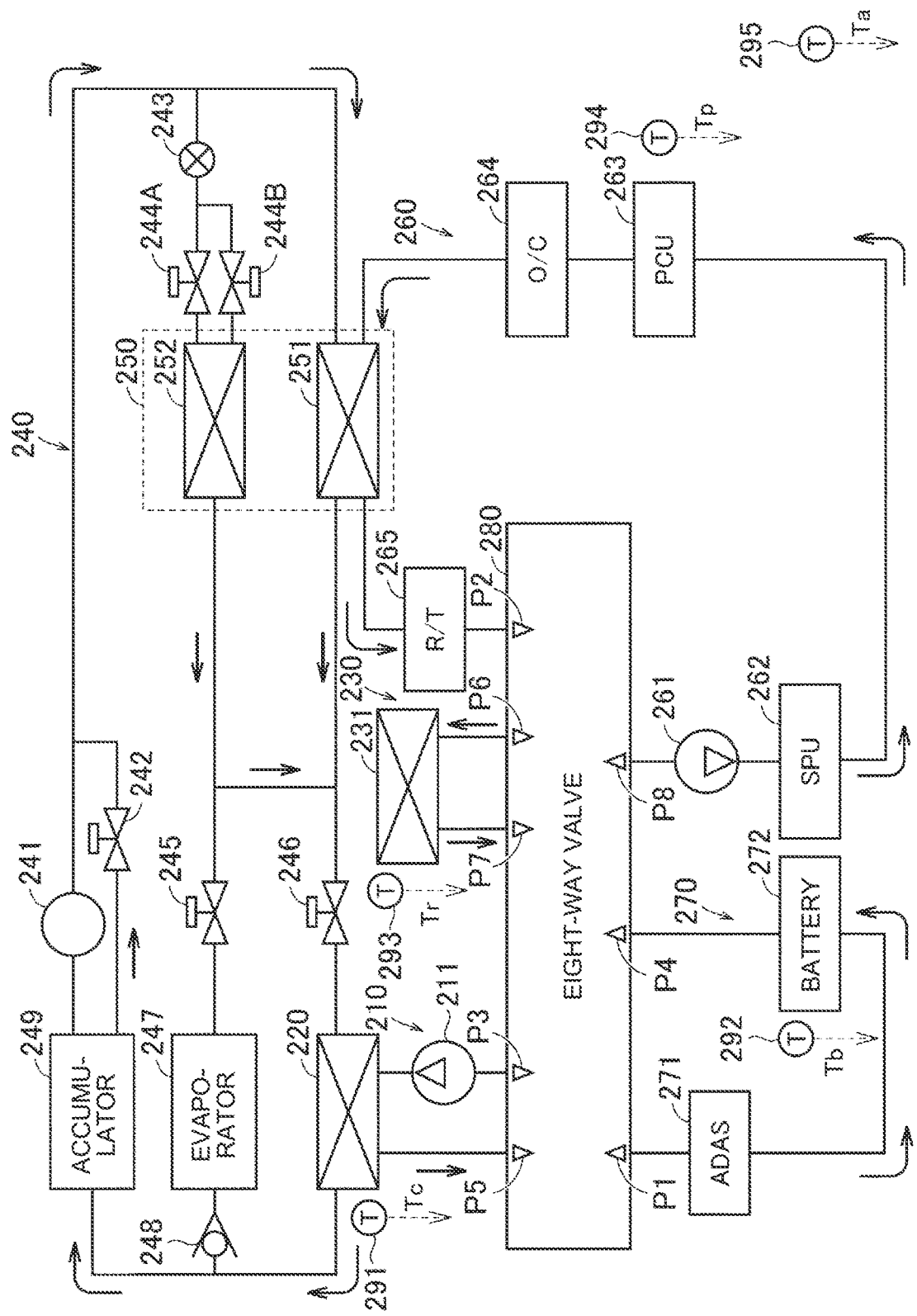
FIG. 17 shows the configuration of a thermal management circuit according to a fifth embodiment.

FIG. 17 shows the configuration of the thermal management circuit according to the fifth embodiment. A thermal management circuit 200 includes, for example, a chiller circuit 210, a chiller 220, a radiator circuit 230, a refrigeration cycle 240, a condenser 250, a drive unit circuit 260, a battery circuit 270, an eight-way valve 280, and temperature sensors 291 to 295.

The chiller circuit 210 includes a water pump (W/P) 211. The chiller 220 is connected to (shared by) both the chiller circuit 210 and the refrigeration cycle 240. The radiator circuit 230 includes a radiator 231. The refrigeration cycle 240 includes, for example, a compressor 241, an electromagnetic valve 242, an expansion valve 243, electromagnetic valves 244A, 244B, 245, 246, an evaporator 247, an orifice (expansion valve) 248, and an accumulator 249. The condenser 250 includes a water-cooled condenser 251 and an air-cooled condenser 252, and is connected to both the refrigeration cycle 240 and the drive unit circuit 260. The drive unit circuit 260 includes, for example, a water pump 261, an SPU 262, a PCU 263, an oil cooler 264, and a reservoir tank 265. The battery circuit 270 includes, for example, an advanced driver-assistance system (ADAS) 271 and a battery 272.

A heat medium circulating in the chiller circuit 210 flows through a path of "eight-way valve 280 (port P3)-water pump 211-chiller 220-eight-way valve 280 (port P5)".

The water pump 211 circulates the heat medium in the chiller circuit 210 in accordance with a control command from the ECU 500. The chiller 220 exchanges heat between the heat medium circulating in the chiller circuit 210 and the heat medium circulating in the refrigeration cycle 240. The eight-way valve 280 switches the path to which the chiller circuit 210 is connected in accordance with a control command from the ECU 500. The switching of the path by the eight-way valve 280 will be described in detail later.

The heat medium circulating in the radiator circuit 230 flows between the radiator 231 and the eight-way valve 280 (ports P6, P7). The radiator 231 is disposed downstream of a grille shutter (not shown), and exchanges heat between air outside the vehicle and the heat medium.

The heat medium (gas-phase refrigerant or liquid-phase refrigerant) circulating in the refrigeration cycle 240 flows through any one of a first path to a third path. The first path is a path of "compressor 241-expansion valve 243-electromagnetic valves 244 (244A, 244B)-air-cooled condenser 252-electromagnetic valve 245-evaporator 247-orifice 248-accumulator 249-compressor 241". The second path is a path of "compressor 241-water-cooled condenser 251-electromagnetic valve 246-chiller 220-accumulator 249-compressor 241". The third path is a path of "compressor 241-expansion valve 243-electromagnetic valves 244 (244A, 244B)-air-cooled condenser 252-electromagnetic valve 246-chiller 220-accumulator 249-compressor 241".

The compressor 241 compresses the gas-phase refrigerant circulating in the refrigeration cycle 240 in accordance with a control command from the ECU 500. The electromagnetic valve 242 is connected in parallel to the compressor 241, and adjusts the amount of the gas-phase refrigerant flowing into the compressor 241 in accordance with a control command from the ECU 500. The expansion valve 243 expands the high-pressure liquid-phase refrigerant compressed by the compressor 241 to decompress the liquid-phase refrigerant. The electromagnetic valves 244 (244A, 244B) switch ON/OFF of the flow of the liquid-phase refrigerant between the expansion valve 243 and the air-cooled condenser 252 in accordance with a control command from the ECU 500. The air-cooled condenser 252 exchanges heat with the water-cooled condenser 251 of the drive unit circuit 260. The electromagnetic valve 245 restricts the flow of the liquid-phase refrigerant into the evaporator 247 in accordance with a control command from the ECU 500. The electromagnetic valve 246 restricts the flow of the liquid-phase refrigerant into the chiller 220 in accordance with a control command from the ECU 500. The orifice 248 decompresses the refrigerant from the evaporator 247. The accumulator 249 prevents the liquid-phase refrigerant from being sucked into the compressor 241 when the refrigerant is not completely evaporated by the evaporator 247.

A heat medium (coolant) circulating in the drive unit circuit 260 flows through a path of "eight-way valve 280 (port P8)-water pump 261-SPU 262-PCU 263-oil cooler 264-water-cooled condenser 251-reservoir tank 265-eight-way valve 280 (port P2)".

The water pump 261 circulates the heat medium in the drive unit circuit 260 in accordance with a control command from the ECU 500. The SPU 262 controls charge and discharge of the battery 272 in accordance with a control command from the ECU 500. The PCU 263 converts DC power supplied from the battery 272 into AC power and supplies the AC power to the motor (not shown) built in the transaxle in accordance with a control command from the ECU 500. The oil cooler 264 cools the transaxle through heat exchange between the heat medium circulating in the drive unit circuit 260 and the lubricating oil for the motor. The SPU 262, the PCU 263, and the oil cooler 264 are cooled by the heat medium circulating in the drive unit circuit 260. The water-cooled condenser 251 exchanges heat with the air-cooled condenser 252 of the refrigeration cycle 240. The reservoir tank 265 maintains the pressure and the amount of the heat medium in the drive unit circuit 260 by storing a part of the heat medium in the drive unit circuit 260 (heat medium flowing out along with a pressure increase). The water-cooled condenser 251 corresponds to the "radiator" according to the present disclosure.

A heat medium (coolant) circulating in the battery circuit 270 flows through a path of "eight-way valve 280 (port P1)-ADAS 271-battery 272-eight-way valve 280 (port P4)".

The ADAS 271 includes, for example, adaptive cruise control (ACC), auto speed limiter (ASL), lane keeping assist (LKA), pre-crash safety (PCS), and lane departure alert (LDA). The battery circuit 270 may include an autonomous driving system (ADS) in addition to the ADAS 271. The battery 272 supplies electric power for traveling to the motor generator built in the transaxle.

The eight-way valve 280 includes the ports P1 to P8 (see FIGS. 18 and 19), and is connected to the chiller circuit 210, the radiator circuit 230, the drive unit circuit 260, and the battery circuit 270. The eight-way valve 280 corresponds to the "switching valve" according to the present disclosure.

The temperature sensor 291 detects the temperature of the heat medium flowing in the radiator 231 (radiator medium temperature Tr). The temperature sensor 292 detects the temperature (chiller medium temperature Tc) of the refrigerant (may be a heat medium instead of the refrigerant) flowing in the chiller 220. The temperature sensor 293 detects the temperature of the heat medium flowing in the battery 272 (battery medium temperature Tb). The temperature sensor 294 detects the temperature of the heat medium flowing in the PCU 263 (powertrain medium temperature Tp). The temperature sensor 295 detects the temperature outside the vehicle (outside air temperature Ta). The sensors output sensor values indicating detection results to the ECU 500. The temperature sensor 292 corresponds to the "first temperature sensor" according to the present disclosure. The temperature sensor 291 corresponds to the "second temperature sensor" according to the present disclosure.

Figure 18:
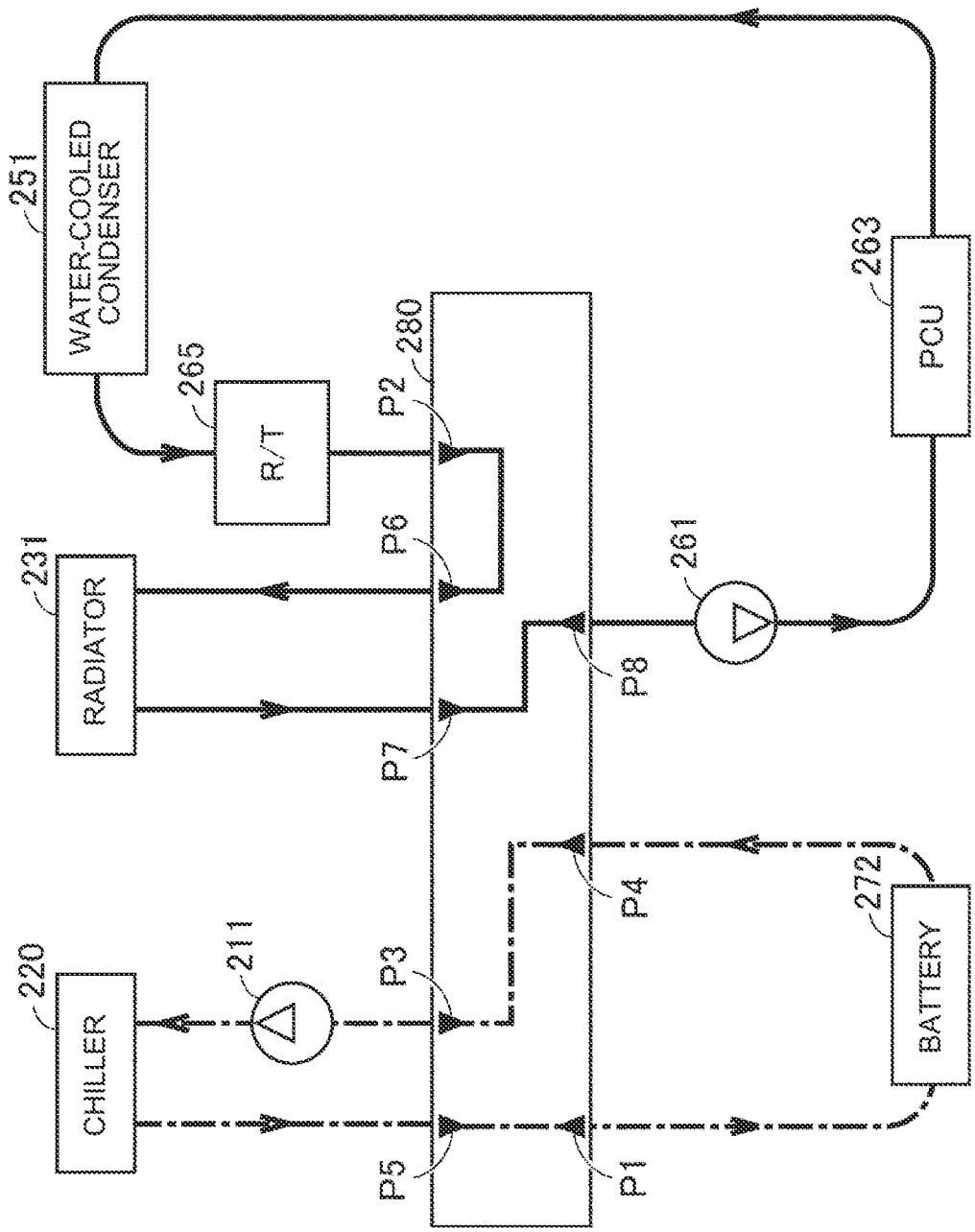
FIG. 18 illustrates a first circuit mode according to the fifth embodiment.

FIG. 18 illustrates a first circuit mode according to the fifth embodiment. In the first circuit mode, for example, the battery circuit 270 and the chiller circuit 210 are connected in series and the drive unit circuit 260 and the radiator circuit 230 are connected in series by the eight-way valve 280. More specifically, a first path is formed such that the heat medium flows in the order of "port P1-battery 272-port P4-port P3-water pump 211-chiller 220-port P5-port P1". Further, a second path is formed such that the heat medium flows in the order of "port P8-water pump 261-PCU 263-water-cooled condenser 251-reservoir tank 265-port P2-port P6-radiator 231-port P7-port P8". The first path and the second path are connected in parallel.

Figure 19:
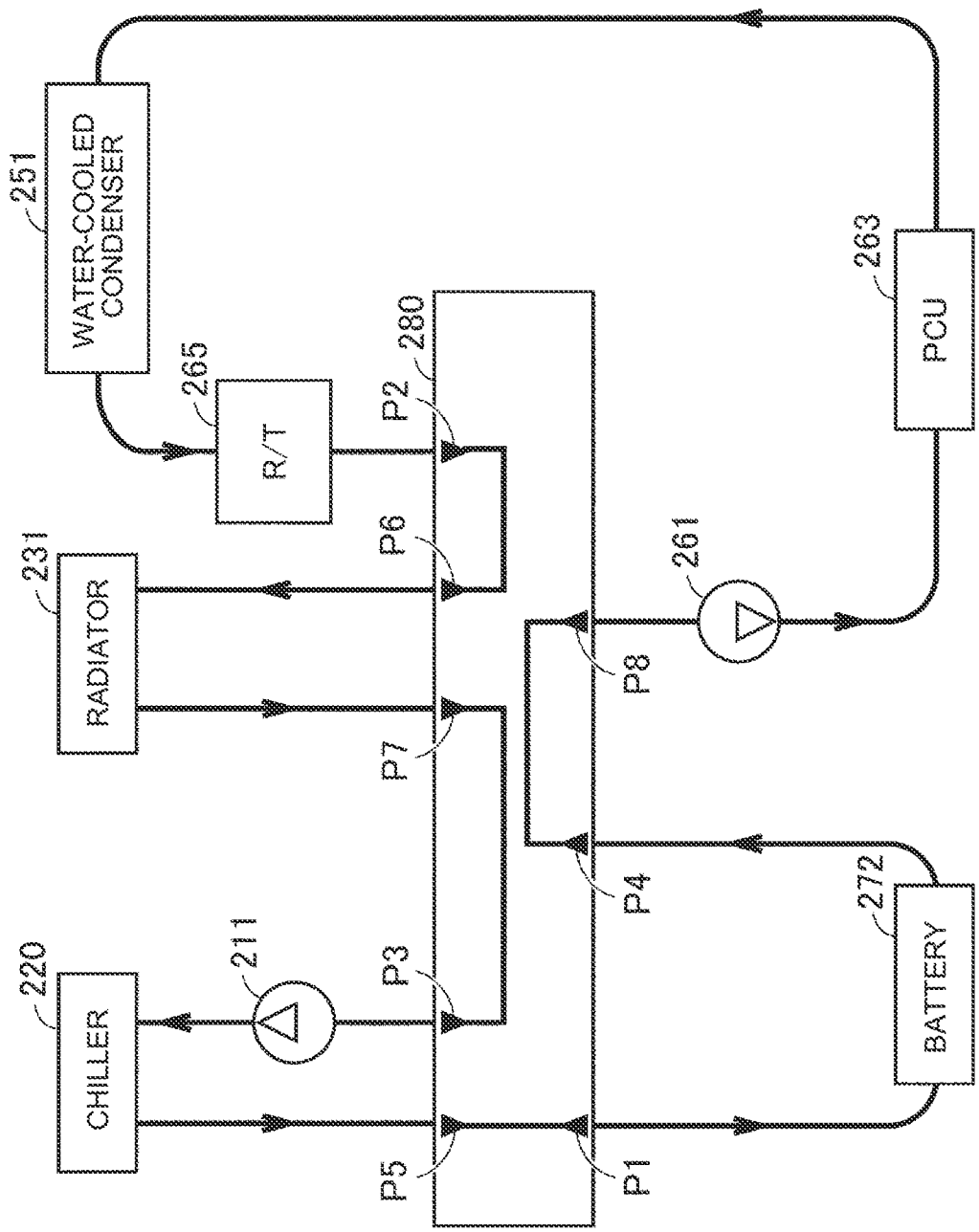
FIG. 19 illustrates a second circuit mode according to the fifth embodiment.

FIG. 19 illustrates a second circuit mode according to the fifth embodiment. In the second circuit mode, for example, all the battery circuit 270, the drive unit circuit 260, the radiator circuit 230, and the chiller circuit 210 are connected in series by the eight-way valve 280. More specifically, a path is formed such that the heat medium flows in the order of "port P1-battery 272-port P4-port P8-water pump 261-PCU 263-water-cooled condenser 251-reservoir tank 265-port P2-port P6-radiator 231-port P7-port P3-water pump 211-chiller 220-port P5-port P1".

In the system configuration employing the thermal management circuit 200, the ECU 500 may execute the compressor control described in the first embodiment (see FIG. 7) or the powertrain control described in the modification of the second embodiment (see FIG. 11). The ECU 500 may execute the powertrain control described in the modification of the third embodiment (see FIG. 15). Since these controls have already been described in detail, the description will not be repeated.

According to the fifth embodiment, the steep change in the chiller medium temperature Tc is suppressed as in the first to third embodiments (or their modifications). As a result, the deterioration of the air conditioning comfort can be suppressed.

The embodiments disclosed herein should be construed as illustrative in all respects and not limiting. The scope of the present disclosure is shown by the claims rather than by the above description of the embodiments, and is intended to include all modifications within the meaning and scope equivalent to those of the claims.

What is claimed is:

1. A thermal management system comprising:
    a battery through which a heat medium flows;
    a radiator through which the heat medium flows;
    a refrigeration cycle through which a refrigerant flows;
    a chiller configured to exchange heat between the heat medium and the refrigerant; and
    a switching valve configured to switch a first circuit mode and a second circuit mode, wherein
    the first circuit mode is a mode in which the chiller is thermally connected to the battery,
    the second circuit mode is a mode in which the chiller is thermally disconnected from the battery and is thermally connected to the radiator,
    the thermal management system includes:
        a first temperature sensor configured to detect a chiller temperature that is a temperature of the refrigerant flowing through the chiller;
        a second temperature sensor configured to detect a radiator temperature that is a temperature of the heat medium flowing through the radiator;
        a temperature adjustment device configured to adjust the temperature of one of the heat medium and the refrigerant; and
        a control device configured to control the temperature adjustment device based on the chiller temperature and the radiator temperature, and
    the control device is configured to, in a case where switching between the first circuit mode and the second circuit mode is performed by controlling the switching valve during a heating operation of the refrigeration cycle, control the temperature adjustment device to reduce a temperature difference between the chiller temperature and the radiator temperature prior to the switching.

2. The thermal management system according to claim 1, wherein:
    the control device is configured to, when the temperature difference between the chiller temperature and the radiator temperature is larger than a reference value in the case where the switching between the first circuit mode and the second circuit mode is performed by controlling the switching valve during the heating operation of the refrigeration cycle, control the temperature adjustment device to reduce the temperature difference below the reference value prior to the switching; and
    the reference value is a predetermined value set to suppress deterioration of air conditioning comfort performance.

3. The thermal management system according to claim 2, wherein:
    the temperature adjustment device includes a compressor configured to compress the refrigerant flowing through the refrigeration cycle; and
    the control device is configured to, when the temperature difference is larger than the reference value in the first circuit mode in a case where switching from the first circuit mode to the second circuit mode is performed at an end of cooling of the battery by the chiller during the heating operation of the refrigeration cycle, control a rotation speed of the compressor to reduce the temperature difference below the reference value.

4. The thermal management system according to claim 3, wherein the control device is configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, reduce the chiller temperature by increasing the rotation speed of the compressor in the first circuit mode compared to a case where the temperature difference is smaller than the reference value.

5. The thermal management system according to claim 3, wherein the control device is configured to, when the temperature difference is larger than the reference value in a case where the switching from the first circuit mode to the second circuit mode is performed at the end of the cooling of the battery by the chiller during the heating operation of the refrigeration cycle and the chiller temperature is lower than the radiator temperature in the first circuit mode, increase the chiller temperature by reducing the rotation speed of the compressor in the first circuit mode compared to a case where the temperature difference is smaller than the reference value.

6. The thermal management system according to claim 2, wherein:
    the temperature adjustment device includes an electric heater configured to heat the heat medium flowing through the radiator; and
    the control device is configured to, when the temperature difference is larger than the reference value in the first circuit mode in a case where switching from the first circuit mode to the second circuit mode is performed at an end of cooling of the battery by the chiller, control a heat generation amount of the electric heater to reduce the temperature difference below the reference value.

7. The thermal management system according to claim 6, wherein the control device is configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, increase the radiator temperature by increasing the heat generation amount of the electric heater compared to a case where the temperature difference is smaller than the reference value.

8. The thermal management system according to claim 2, wherein:
the temperature adjustment device includes a power conversion device through which the heat medium flowing through the radiator flows; and
the control device is configured to, when the temperature difference is larger than the reference value in the first circuit mode in a case where switching from the first circuit mode to the second circuit mode is performed at an end of cooling of the battery by the chiller, control a heat loss of the power conversion device to reduce the temperature difference below the reference value.

9. The thermal management system according to claim 8, wherein the control device is configured to, when the temperature difference is larger than the reference value in the first circuit mode in a case where the switching from the first circuit mode to the second circuit mode is performed at the end of the cooling of the battery by the chiller during the heating operation of the refrigeration cycle and the chiller temperature is higher than the radiator temperature in the first circuit mode, increase the radiator temperature by increasing the heat loss of the power conversion device compared to a case where the temperature difference is smaller than the reference value.

10. The thermal management system according to claim 2, wherein:
the temperature adjustment device includes an electric heater configured to heat the heat medium flowing through the radiator; and
the control device is configured to, when the temperature difference is larger than the reference value in the second circuit mode in a case where switching from the second circuit mode to the first circuit mode is performed to start cooling of the battery by the chiller, control a heat generation amount of the electric heater to reduce the temperature difference below the reference value.

11. The thermal management system according to claim 10, wherein the control device is configured to, when the temperature difference is larger than the reference value in the second circuit mode in a case where the switching from the second circuit mode to the first circuit mode is performed to start the cooling of the battery by the chiller and the chiller temperature is higher than the radiator temperature in the second circuit mode, increase the radiator temperature by increasing the heat generation amount of the electric heater compared to a case where the temperature difference is smaller than the reference value.

12. The thermal management system according to claim 2, wherein:
the temperature adjustment device includes a power conversion device through which the heat medium flowing through the radiator flows; and
the control device is configured to, when the temperature difference is larger than the reference value in the second circuit mode in a case where switching from the second circuit mode to the first circuit mode is performed to start cooling of the battery by the chiller, control a heat loss of the power conversion device to reduce the temperature difference below the reference value.

13. The thermal management system according to claim 12, wherein the control device is configured to, when the temperature difference is larger than the reference value in the second circuit mode in a case where the switching from the second circuit mode to the first circuit mode is performed to start the cooling of the battery by the chiller and the chiller temperature is higher than the radiator temperature in the second circuit mode, increase the radiator temperature by increasing the heat loss of the power conversion device compared to a case where the temperature difference is smaller than the reference value.

14. A vehicle comprising the thermal management system according to claim 1.

15. A control method for a thermal management circuit, the thermal management circuit including:
a battery through which a heat medium flows;
a radiator through which the heat medium flows;
a refrigeration cycle through which a refrigerant flows;
a chiller configured to exchange heat between the heat medium and the refrigerant;
a switching valve configured to switch a first circuit mode and a second circuit mode; and
a temperature adjustment device configured to adjust a temperature of one of the heat medium and the refrigerant,
the first circuit mode being a mode in which the chiller is thermally connected to the battery,
the second circuit mode being a mode in which the chiller is thermally disconnected from the battery and is thermally connected to the radiator,
the control method comprising:
a step of detecting a chiller temperature that is a temperature of the refrigerant flowing through the chiller;
a step of detecting a radiator temperature that is a temperature of the heat medium flowing through the radiator; and
a step of controlling the temperature adjustment device based on the chiller temperature and the radiator temperature, wherein
the step of controlling includes a step of controlling, in a case where switching between the first circuit mode and the second circuit mode is performed by controlling the switching valve during a heating operation of the refrigeration cycle, the temperature adjustment device to reduce a temperature difference between the chiller temperature and the radiator temperature prior to the switching.

16. The control method according to claim 15, wherein:
the step of controlling includes a step of controlling, when the temperature difference between the chiller temperature and the radiator temperature is larger than a reference value in the case where the switching between the first circuit mode and the second circuit mode is performed by controlling the switching valve during the heating operation of the refrigeration cycle, the temperature adjustment device to reduce the temperature difference below the reference value prior to the switching; and
the reference value is a predetermined value set to suppress deterioration of air conditioning comfort performance.

* * * * *